US007657471B1

(12) United States Patent
Sankaran et al.

(10) Patent No.: US 7,657,471 B1
(45) Date of Patent: Feb. 2, 2010

(54) METHOD AND APPARATUS PROVIDING AUTOMATED FINANCIAL PLAN CONTROLS

(75) Inventors: Sarat C. Sankaran, San Carlos, CA (US); Prashant Fuloria, Mountain View, CA (US); Rajesh Chandran, San Mateo, CA (US)

(73) Assignee: Lawson Software, Inc., St. Paul, MN (US)

( * ) Notice: Subject to any disclaimer, the term of this patent is extended or adjusted under 35 U.S.C. 154(b) by 1888 days.

(21) Appl. No.: 09/969,134

(22) Filed: Oct. 1, 2001

(51) Int. Cl.
*G06Q 40/00* (2006.01)
*G07B 17/00* (2006.01)
(52) U.S. Cl. .......................................... 705/35; 705/30
(58) Field of Classification Search .................. 705/30, 705/35
See application file for complete search history.

(56) References Cited

U.S. PATENT DOCUMENTS

| 5,621,201 | A | 4/1997 | Langhans et al. |
| 5,914,472 | A | 6/1999 | Foladare et al. |
| 6,012,044 | A | 1/2000 | Maggioncalda et al. |
| 6,021,943 | A | 2/2000 | Chastain |
| 6,029,158 | A | 2/2000 | Bertrand et al. |
| 6,073,127 | A | 6/2000 | Lannert et al. |
| 6,173,269 | B1 | 1/2001 | Solokl et al. |
| 2001/0041996 | A1 | 11/2001 | Eder |
| 2002/0095363 | A1 | 7/2002 | Sloan et al. |
| 2002/0111890 | A1 | 8/2002 | Sloan et al. |
| 2002/0133444 | A1 | 9/2002 | Sankaran et al. |

FOREIGN PATENT DOCUMENTS

JP   2002092465 A   3/2002

WO   WO 02/073365 A2   9/2002

OTHER PUBLICATIONS

Townsend, Carl. Mastering Excel 4 for Windows. Sybex Inc. 1992. pp. xxix-xxxi; 39-48; 75-83; 87-95; 151-153; 167-195; 256-259; 324-326; 345-357; 607-635; 725-726.*
Price, John Ellis; Haddock, M. David; Brock, Horace R; College Accounting. 7th Edition. Macmillan/McGraw-Hill School Publishing Company. 1994. pp. 966-982.*
Raiborn, Cecily A; Barfield, Jesse T; Kinney, Michael T. Managerial Accounting. West Publishing Company. 1993. pp. 20-22; 463-488; 500-528; 655-659; 667-672; 731-734.*
Townsend, Carl. Mastering Excel 4 for Windows. Sybex Inc. 1992. pp. xxix-xxxi; 39-48; 75-83; 87-95; 149-153; 167-195; 256-259; 324-326; 345-357; 607-635; 725-726.*

* cited by examiner

*Primary Examiner*—Jason M Borlinghaus
(74) *Attorney, Agent, or Firm*—Schwegman, Lundberg & Woessner, P.A.

(57) ABSTRACT

Techniques providing automatic control of a distributed electronic financial plan are disclosed. A set of financial statements is created and populated with planned data values that are stored in a database. In certain embodiments, statements in the set are logically linked to facilitate automatic updating as changes occur. The P&L, balance sheet and statement of cash flow are all automatically configured with certain calculated lines and standard lines that maintain proper accounting relationships among the electronic financial plan documents. Spending lines of the P&L are linked meaningfully to constrain spending plans of the corresponding underlying departments so that the P&L becomes conservative in terms of spending. One or more organizational hierarchies may be created and stored, based on departmental organization or revenue flows, and sets of P&Ls, balance sheets, and statements of cash flows are associated with nodes in these hierarchies. A roll-up statement may be created based on any of the hierarchies, enabling a user to rapidly obtain alternative views of lower-level plan data. The user may also prepare multiple different linked groups of P&Ls, balance sheets, and statements of cash flows to view and evaluate multiple scenarios of financial performance.

16 Claims, 30 Drawing Sheets

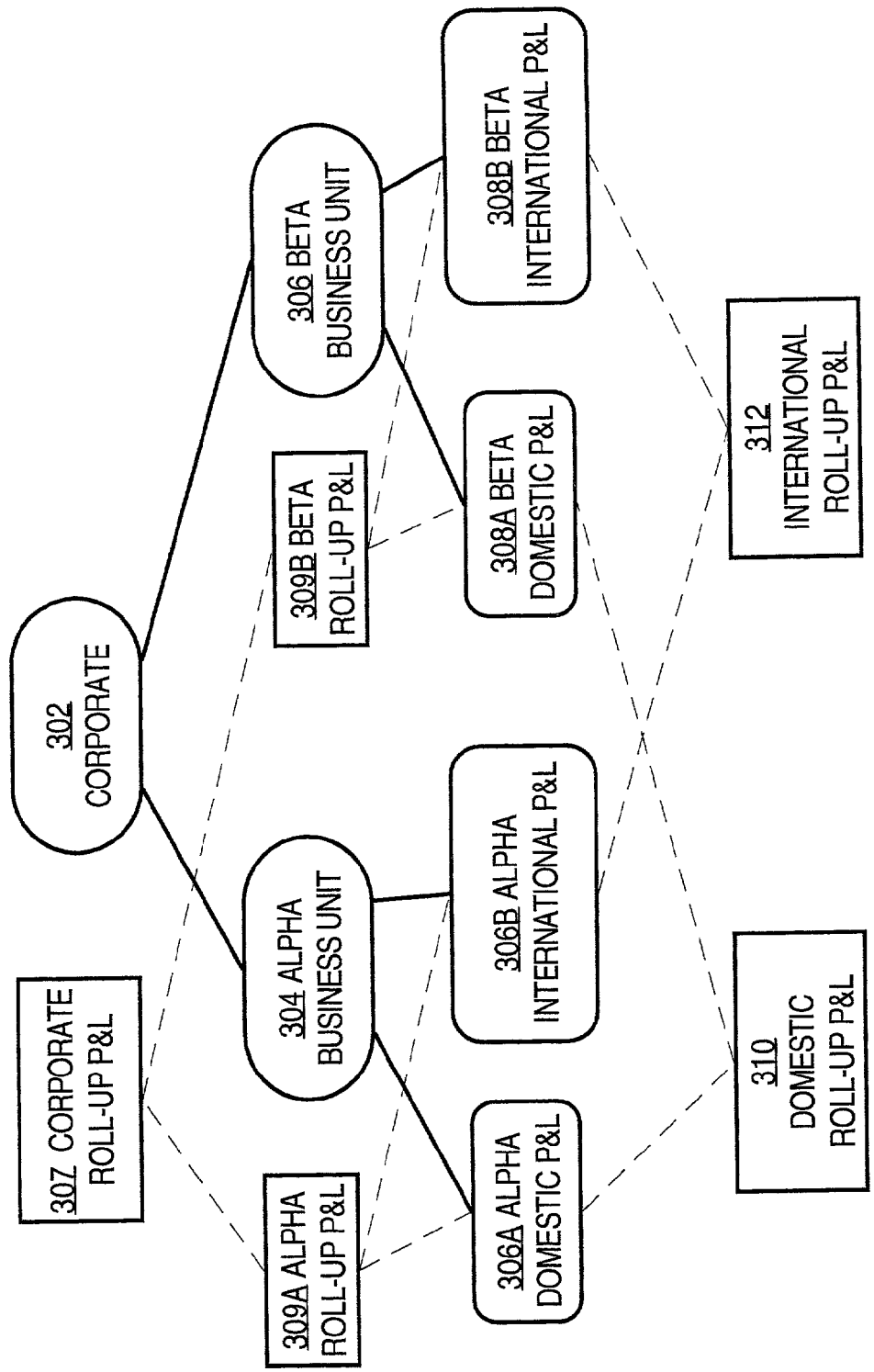

BizPlanManager

MyPlan | SharedPlan | Messages | Reports | Config

P&L: Corporate

| | Sep FY01 | | Oct FY01 | | Nov FY01 | | Dec FY01 | | Jan FY02 | | Feb FY02 | | Mar FY | |
|---|---|---|---|---|---|---|---|---|---|---|---|---|---|---|
| | (USD '000) | (% Rev) | (USD '000) | (% Rev) | (USD '000) | (% Rev) | (USD '000) | (% Rev) | (USD '000) | (% Rev) | (USD '000) | (% Rev) | (USD '000) | (% Rev) |
| Revenue | 69,333.3 | 100.0 | 68,333.3 | 100.0 | 68,333.3 | 100.0 | 68,333.3 | 100.0 | 74,333.3 | 100.0 | 74,333.3 | 100.0 | 74,333.3 | |
| COS | 31,833.3 | 45.9 | 30,250.0 | 44.3 | 30,250.0 | 44.3 | 30,250.0 | 44.3 | 32,383.3 | 43.6 | 32,383.3 | 43.6 | 32,383.3 | |
| Gross Profit | 37,500.0 | 54.1 | 38,083.3 | 55.7 | 38,083.3 | 55.7 | 38,083.3 | 55.7 | 41,950.0 | 56.4 | 41,950.0 | 56.4 | 41,950.0 | |
| G&A | 3,533.3 | 5.1 | 3,700.0 | 5.4 | 3,700.0 | 5.4 | 3,700.0 | 5.4 | 4,433.3 | 6.0 | 4,433.3 | 6.0 | 4,433.3 | |
| R&D | 6,466.7 | 9.3 | 6,666.7 | 9.8 | 6,666.7 | 9.8 | 6,666.7 | 9.8 | 7,850.0 | 10.6 | 7,850.0 | 10.6 | 7,850.0 | |
| Sales & Mktg | 7,166.7 | 10.3 | 7,383.4 | 10.8 | 7,383.4 | 10.8 | 7,383.4 | 10.8 | 8,766.7 | 11.8 | 8,766.7 | 11.8 | 8,766.7 | |
| Op Exp | 17,166.7 | 24.8 | 17,750.0 | 26.0 | 17,750.0 | 26.0 | 17,750.0 | 26.0 | 21,050.0 | 28.3 | 21,050.0 | 28.3 | 21,050.0 | |
| Op Inc | 20,333.3 | 29.3 | 20,333.3 | 29.8 | 20,333.3 | 29.8 | 20,333.3 | 29.8 | 20,900.0 | 28.1 | 20,900.0 | 28.1 | 20,900.0 | |
| Other Inc/Exp | 41.7 | 0.1 | 50.0 | 0.1 | 50.0 | 0.1 | 50.0 | 0.1 | 50.0 | 0.1 | 50.0 | 0.1 | 50.0 | |
| Tax | 8,816.7 | 12.7 | 8,820.0 | 12.9 | 8,820.0 | 12.9 | 8,820.0 | 12.9 | 9,046.7 | 12.2 | 9,046.7 | 12.2 | 9,046.7 | |
| Net Inc | 11,558.3 | 16.7 | 11,563.3 | 16.9 | 11,563.3 | 16.9 | 11,563.3 | 16.9 | 11,903.3 | 16.0 | 11,903.3 | 16.0 | 11,903.3 | |
| Shares ('000) | 23,500 | | 23,500 | | 23,500 | | 23,500 | | 23,500 | | 23,500 | | 23,500 | |
| EPS (USD) | 0.4918 | | 0.4921 | | 0.4921 | | 0.4921 | | 0.5065 | | 0.5065 | | 0.5065 | |

John Taylor (Corporate)

FIG. 3E

| My Plan | Shared Plan | Messages | Reports | Config |

P&L | Bal Sheet & Cash Flow

Config – Bal Sheet & Cash Flow – Add Line        700

Select Bal Sheet Location        [▼ Current Assets] — 702

Select Cash Flows Location       [▼ Operating] — 704

Enter Bal Sheet Line Name        [Prepaid Expenses] — 706

Enter Cash Flows Line Name       [Decrease in Prepaid Expenses] — 708

Add — 710
Cancel

Corp Finance

*Fig. 7A*

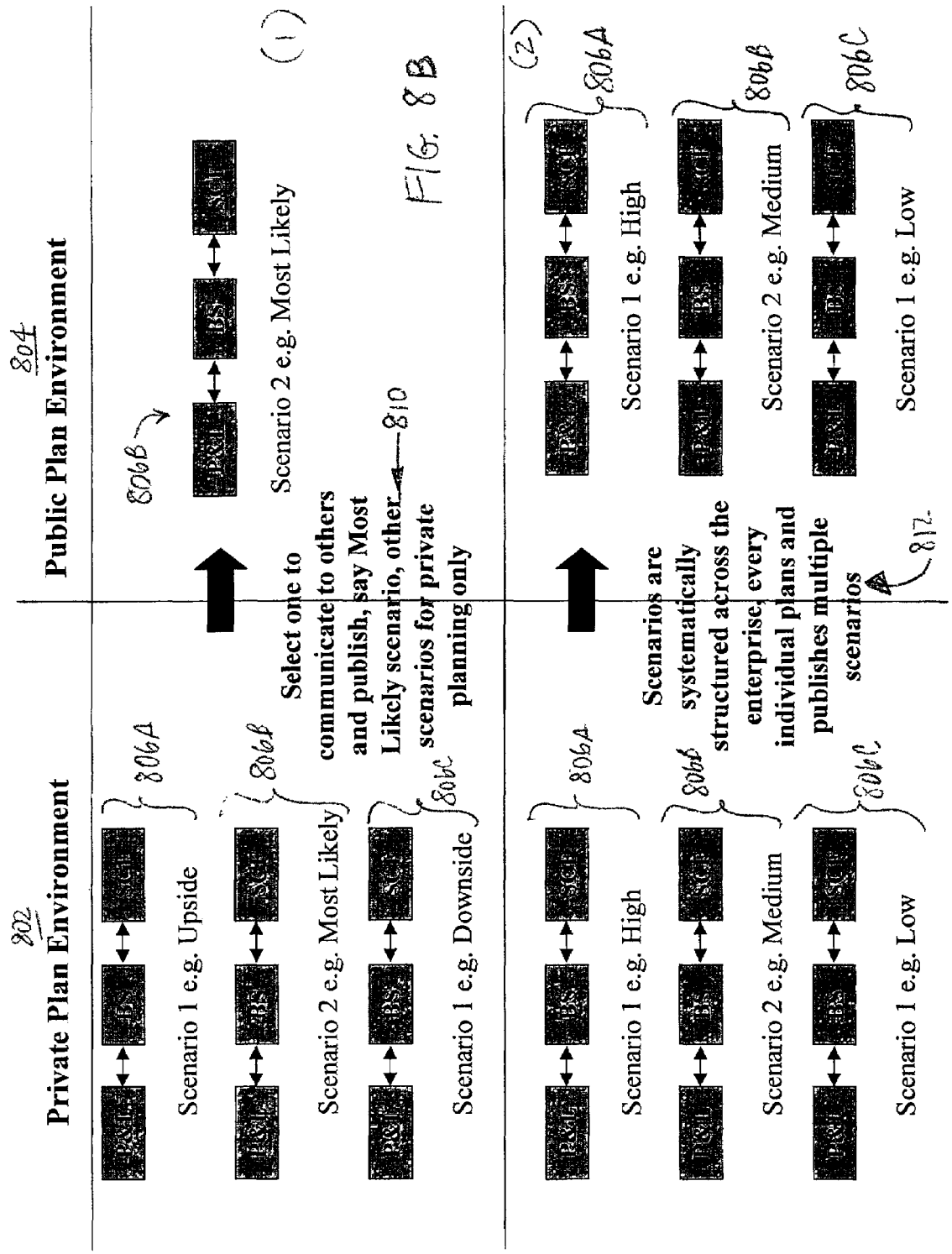

SpendCap™ Manager
MyPlan | SharedPlan | Messages | Reports | Config

P&L: BU Hardware

| | Sep FY01 | | | Oct FY01 | | | Nov FY01 | | | Dec FY01 | | | Jan FY02 | | | Feb FY02 | | | Mar FY | | |
|---|---|---|---|---|---|---|---|---|---|---|---|---|---|---|---|---|---|---|---|---|---|
| | (USD '000) | (% Rev) | | (USD '000) | (% Rev) | | (USD '000) | (% Rev) | | (USD '000) | (% Rev) | | (USD '000) | (% Rev) | | (USD '000) | (% Rev) | | (USD '000) | (% Rev) | |
| Revenue | 29,085.1 | 100.0 | | 29,453.0 | 100.0 | | 27,888.6 | 100.0 | | 28,778.5 | 100.0 | | 35,811.8 | 100.0 | | 37,360.5 | 100.0 | | 37,321.5 | 100.0 | |
| COS | 21,640.7 | 74.4 | | 21,952.8 | 74.5 | | 20,811.8 | 74.6 | | 21,506.8 | 74.7 | | 26,656.4 | 74.4 | | 27,790.6 | 74.4 | | 27,727.3 | 74.4 | |
| Gross Profit | 7,444.3 | 25.6 | | 7,500.2 | 25.5 | | 7,076.8 | 25.4 | | 7,271.7 | 25.3 | | 9,155.4 | 25.6 | | 9,569.9 | 25.6 | | 9,594.2 | 25.6 | |
| G&A | 800.0 | 2.8 | | 800.0 | 2.7 | | 800.0 | 2.9 | | 800.0 | 2.8 | | 966.7 | 2.7 | | 966.7 | 2.6 | | 966.7 | 2.6 | |
| R&D | 2,735.0 | 9.4 | | 2,750.0 | 9.3 | | 2,750.0 | 9.9 | | 2,750.0 | 9.6 | | 3,300.0 | 9.2 | | 3,300.0 | 8.8 | | 3,300.0 | 8.8 | |
| Sales & Mktg | 1,210.0 | 4.2 | | 1,206.7 | 4.1 | | 1,206.7 | 4.3 | | 1,206.7 | 4.2 | | 1,473.3 | 4.1 | | 1,473.3 | 3.9 | | 1,473.3 | 3.9 | |
| Op Exp | 4,745.0 | 16.3 | | 4,756.7 | 16.2 | | 4,756.7 | 17.1 | | 4,756.7 | 16.5 | | 5,740.0 | 16.0 | | 5,740.0 | 15.4 | | 5,740.0 | 15.4 | |
| Contr | 2,699.3 | 9.3 | | 2,743.5 | 9.3 | | 2,320.1 | 8.3 | | 2,515.1 | 8.7 | | 3,415.4 | 9.5 | | 3,829.9 | 10.3 | | 3,854.2 | 10.3 | |

John Taylor (BU Hardware)

Update Department

DONE 1120  CANCEL 1122  DELETE 1124

1102

Department Name: [SW Applications] 1104

1106 ☐ Mark this Department as a Business Unit?

1108 Parent Department: [SW RDE]

Currency: [US Dollar]
Description: [ ]
Department Code: [2220]
} 1110

Headcount Group: [Software BU] 1112
Capital Asset Group: [Operating Department] 1114

1118

| Account | Action |
|---|---|
| Computer | remove |
| Consulting | remove |
| Contract and Temp Svcs | remove |
| Equipment and Tools | remove |
| Other Employee Related | remove |
| Travel | remove |

1116 Accounts: 117

Additional Currencies:

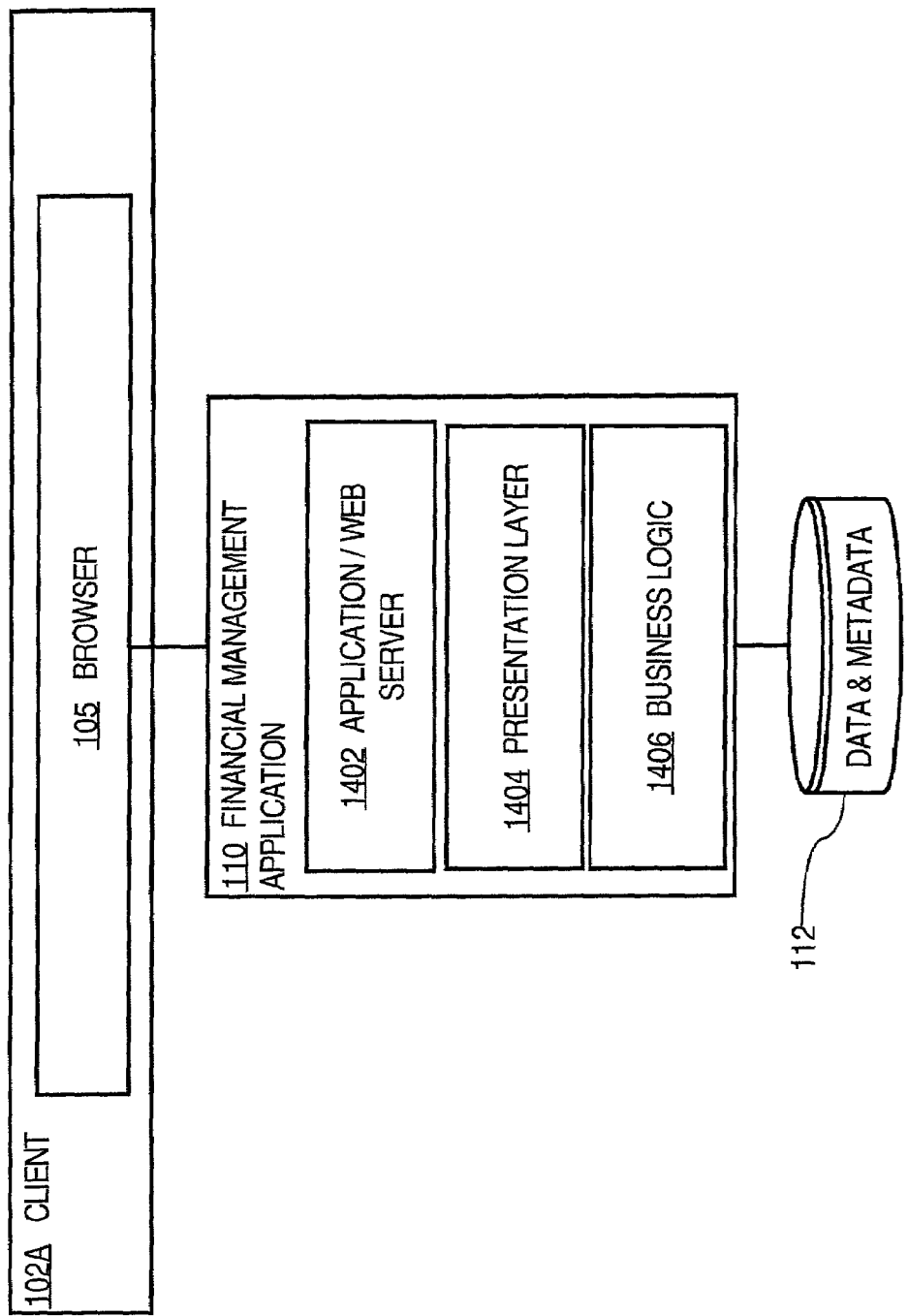

METHOD AND APPARATUS PROVIDING AUTOMATED FINANCIAL PLAN CONTROLS

FIELD OF THE INVENTION

The present invention generally relates to automated, computer-based financial planning. The invention relates more specifically to a method and apparatus for managing one or more distributed and logically linked sets of forward-looking financial statements.

BACKGROUND OF THE INVENTION

A key component of the overall performance of an enterprise is its fiscal performance, typically measured by an integrated set of financial statements—the Profit & Loss (P&L) Statement, the Balance Sheet and the Statement of Cash Flows. Both internal and external constituents of a company rely on these integrated financial statements to provide an indication of the health of the enterprise. The ability for a company to make a good public prediction of its financial performance and then perform according to or better than that prediction is seen as a key indicator of a well-run enterprise. Failure to accurately predict the company's financial performance leads to a loss of confidence in the company's management, with strong negative implications to the company's public valuation. In light of this, it is very important for a company to have in place financial planning systems and processes that help it accurately predict its future financial performance. Another purpose of creating and maintaining forward-looking plans for the company's financial statements is that these plans serve as mechanisms to coordinate various activities within the company, such as selling, manufacturing, recruiting, procuring, investing, etc. These plans help higher-level managers to make intelligent decisions about allocating and re-allocating scarce and valuable resources within the enterprise. This is especially true when these financial plans are tightly linked with the operating plans of the various groups within the company. Most organizations today—both in the government and the private sector—have some sort of processes in place to put together a set of forward-looking financial statements. In some cases, these financial plans are only for internal consumption. In other cases, these plans (or summaries thereof) are shared with the external constituents.

In one commonly used approach, a system of spreadsheets or similar computer tools is used to manage these plans. This approach usually requires the manager of each department, division or business unit to create an independent budget spreadsheet, based upon individual estimates and formulas. Sharing such data within an organization might be accomplished by attaching files to e-mail communications. As a result, higher-level managers may receive numerous submissions from lower-level individuals that these higher-level managers have to consolidate. The lower-level submissions could be presented in inconsistent formats, so that the consolidation of such data is cumbersome and time-consuming. Any change in a lower-level forecast associated with a re-allocation of resources requires this change to flow up multiple levels, usually via a manual and laborious process. As a result these systems are highly deficient when one or both of the following conditions exist:

(a) Financial plans are generated in large, decentralized enterprises: This could include businesses with many budget managers as well as several levels of reporting hierarchies.

(b) Financial plans are revised on a frequent basis due to changing internal and external conditions: This is typical of many enterprises in rapidly changing industries, such as software, high-technology manufacturing, retail, financial services, etc.

Other past approaches include the use of software products designed for budgeting. Some ERP and CRM software vendors offer budgeting products that support their primary product offerings. For example, Oracle Corporation of Redwood Shores, Calif., offers the Oracle Financial Analyzer with its Oracle Financials accounting package. Similarly, SAP A.G., of Walldorf, Germany offers the Strategic Enterprise Management (SEM) product with its ERP package. Some other software vendors also offer standalone budgeting applications. For example, Hyperion Solutions Corporation of Sunnyvale, Calif. offers the Pillar product. These budgeting products solve certain problems associated with managing financial plans in spreadsheets; however, they still have a number of deficiencies. These limitations primarily arise from the fact that these applications have been designed around automating batch-oriented annual or quarterly budgeting processes, but are not geared towards managing the integrated financial plans for an enterprise with the ability to incorporate changes to plans on a continuous basis.

Some of the problems associated with managing the company's forward-looking financial statements in existing systems are listed below:

(a) Individuals who are carrying out such planning activities need visibility into both revenue forecasts as well as spending plans. Thus, there is a need for a way to receive data from revenue forecasts and plan spending in an integrated way, while tracking plan changes across multiple documents. The past approaches fail to provide adequate integration of various electronic financial planning documents.

(b) Past approaches do not support the ability to automatically communicate changes in plans to those individuals who are affected by them.

(c) Still another deficiency of these past approaches is that they enable the user to prepare only one electronic document or version representing a financial plan. The user, however, may desire to prepare multiple scenarios or "pro forma" plans in order to investigate and evaluate different performance possibilities.

(d) A common operation in the financial management process is to roll up numbers. In this context, to roll up numbers means to consolidate (or aggregate) values from lower level nodes of a hierarchy into higher-level nodes of a hierarchy, or to make information from a subordinate in an organization visible for judgment by his or her superior. Such roll-ups enable a user to view spending values by account, by department, by program, etc. However, a key constraint of past approaches has been that only one organizational hierarchy may be defined. Typically the hierarchy represents departments and business units in one particular way that is analogous to an organization chart of an enterprise. However, this is an undesirable limitation. A particular enterprise may have one hierarchical view of its departments that is based on location in association with function, and an alternate view that is based only on function, or based only on a higher level of authority, such as management only.

Based on the foregoing, there is a clear need for an integrated and automated method for planning financial performance as measured by a set of integrated financial statements for the entire enterprise or subsets thereof (such as divisions, business units, regions, etc.), for informing various relevant individuals about changes to these financial statements relating to their areas of responsibility, and for tracking and validating conformance to the plan. There is also a need for to roll up or aggregate the financial statements in ways that correspond to more than one organizational hierarchy.

SUMMARY OF THE INVENTION

The foregoing needs, and other needs and objects that will become apparent for the following description, are achieved in the present invention, which comprises, in one aspect, a method of simultaneously generating a set of related pro-form a financial statements, such as P&L statements, Balance Sheets and Statements of Cash Flows. The financial statements include an electronic forward-looking profit and loss statement that includes at least one planned value for a future accounting period. An electronic forward-looking balance sheet and statement of cash flows are created and stored in association with the profit and loss statement. One or more first logical links are created among one or more lines of the profit and loss statement to one or more related lines of the statement of cash flows. One or more second logical links are created among one or more lines of the balance sheet to one or more related lines of the statement of cash flows. User input is received providing one or more updates to a first electronic document selected from among the profit and loss statement, balance sheet or statement of cash flows. In response, related lines of a second electronic document, selected from among the profit and loss statement, balance sheet or statement of cash flows, are automatically updated according to the first and second logical links.

Thus, in one embodiment, a profit and loss statement is created and populated with planned data values that are stored in a database. Lines of the P&L are linked meaningfully to corresponding underlying department spending plans so that the P&L becomes conservative in terms of spending. The P&L is linked to a corresponding balance sheet and statement of cash flows by logical links that facilitate automatic updating of each document as values in the others change.

One or more organizational hierarchies may be created and stored, based on departments or revenue flows, and sets of P&Ls, balance sheets, and statements of cash flows are associated with nodes in the hierarchies. A roll-up statement may be created based on any of the hierarchies, enabling a user to rapidly obtain alternative views of lower-level plan data. The user may also prepare multiple different linked sets of P&Ls, balance sheets, and statements of cash flows to view and evaluate multiple scenarios of financial performance. These are automatically configured with certain calculated lines and standard lines that maintain proper accounting relationships among the electronic financial plan documents.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3C is a block diagram of electronic financial plan documents that may be created, linked, modified, and managed to provide roll-up views across business units;

FIG. 3E shows a screen display of a P&L in one example embodiment;

FIG. 7A is a diagram of an Add Line page that may be generated to receive user input for creating a new user-defined line in the balance sheet or statement of cash flows;

FIG. 8B is a block diagram illustrating a plurality of alternative sets of linked financial statements and methods of using them;

FIG. 10 shows a screen display of a contribution P&L of a business unit, in one example embodiment;

FIG. 11A shows a screen display that may be used to modify a department hierarchy, in one example embodiment;

FIG. 14 is a block diagram of an example deployment architecture that may be used to implement the embodiments described herein.

DETAILED DESCRIPTION OF THE PREFERRED EMBODIMENT

A method and apparatus providing automated control of spending plans is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Various aspects of the invention are described in sections according to the following outline:
(1) Network Context
(2) Hierarchical Planning Environment and Hierarchical Roll-Ups
(3) Linkages of P&L to Balance Sheet and Statement of Cash Flows
  Electronic Financial Statements
  Calculated Lines
  Standard Lines
  User-Defined Lines
  Metrics for the P&L, Balance Sheet and Statement of Cash Flows
  Linkages To Resource Managers
(4) Multiple Pro-Form a Plans
(5) Overview of Systems Supporting an Implementation
(6) Extensions and Alternatives

(1) Network Context

Figure 1A:
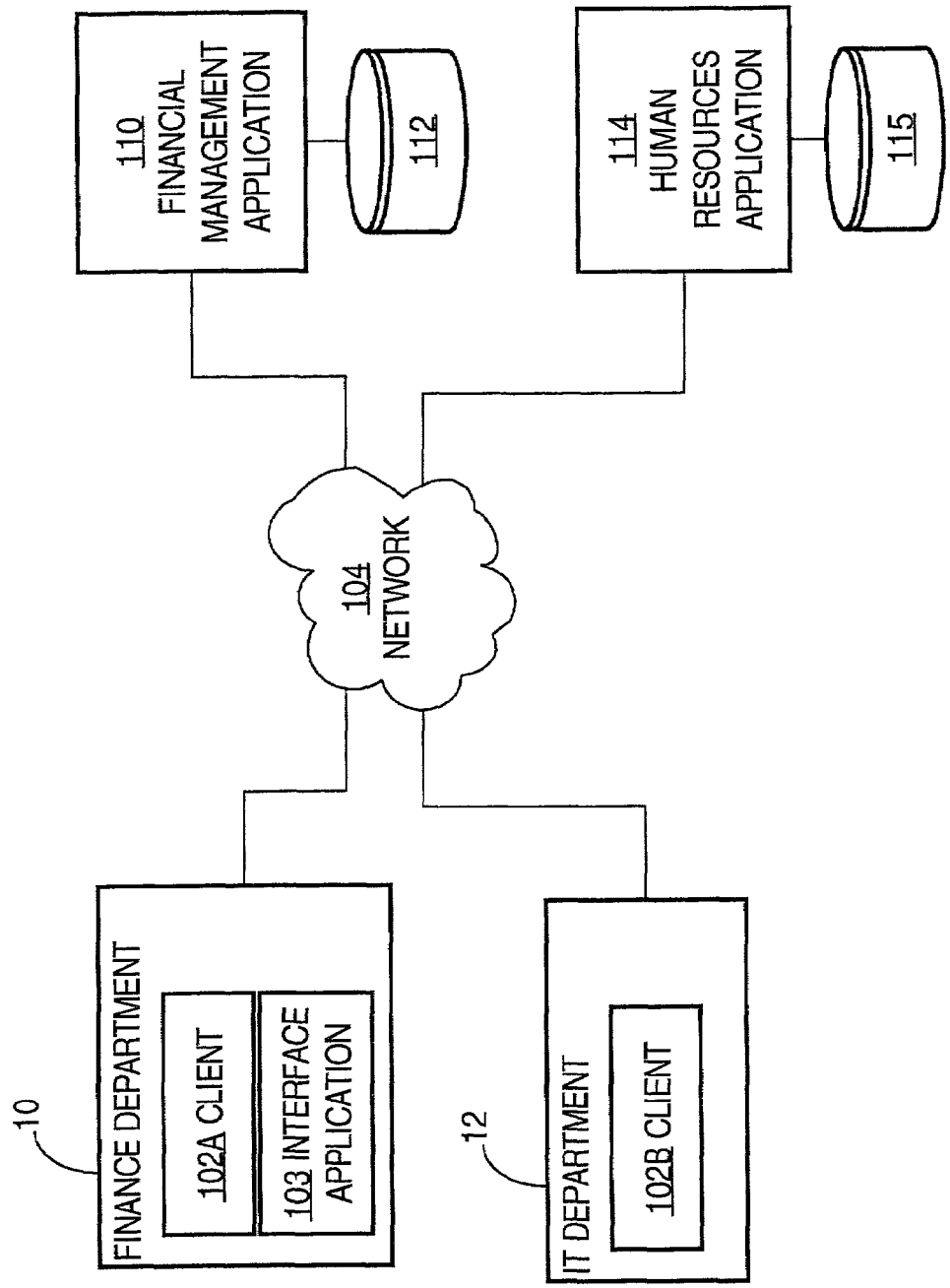
FIG. 1A is a block diagram that illustrates an overview of a network context in which an embodiment may be used.

FIG. 1A is a block diagram that illustrates an overview of a network context in which an embodiment may be used. One or more clients 102A, 102B, which are respectively associated with a first department 10 and second department 12 of an enterprise, are communicatively coupled through network 104 to a Financial Management application 110. Each client 102A, 102B in one embodiment, is a workstation, personal computer, personal digital assistant, or other end station. Alternatively, clients 102A, 102B represent a server, application program, or process that communicates programmatically with Financial Management application 110. Optionally, clients 102A, 102B may execute an interface application 103 to facilitate communications with network 104 and Financial Management application 110, and to facilitate display of information received from them. In one embodiment, interface application 103 is a network browser, for example, Microsoft Internet Explorer, Netscape Navigator, etc.

For purposes of illustrating a simple example embodiment, FIG. 1 depicts two clients 102A, 102B associated with two departments; however, in a practical system there may be any number of clients and any number of departments.

Financial Management application 110 comprises one or more computer program servers, modules, or processes that cooperate to carry out the functions described herein, and optionally additional functions. Financial Management application 110 is communicatively coupled to a database 112 in which the application may store tables of financial data, programmatic objects, stored procedures, etc. An example of a suitable commercially available database is Oracle 8i, commercially available from Oracle Corporation, of Redwood Shores, Calif.

In one embodiment, Financial Management application 110 is configured to store one or more financial statements associated with departments 10, 12, and the enterprise with which they are associated. The financial statements may be stored in database 112, and may contain revenue forecast information, revenue-driven cost of goods sold, operating expenses, taxes etc.

Financial Management application 110 also stores metadata about the enterprise environment, such as one or more hierarchies that represent users, groups, departments, and relationships among them. Examples of such hierarchies are described in application Ser. No. 09/905,258, filed Jul. 12, 2001.

Figure 1B:
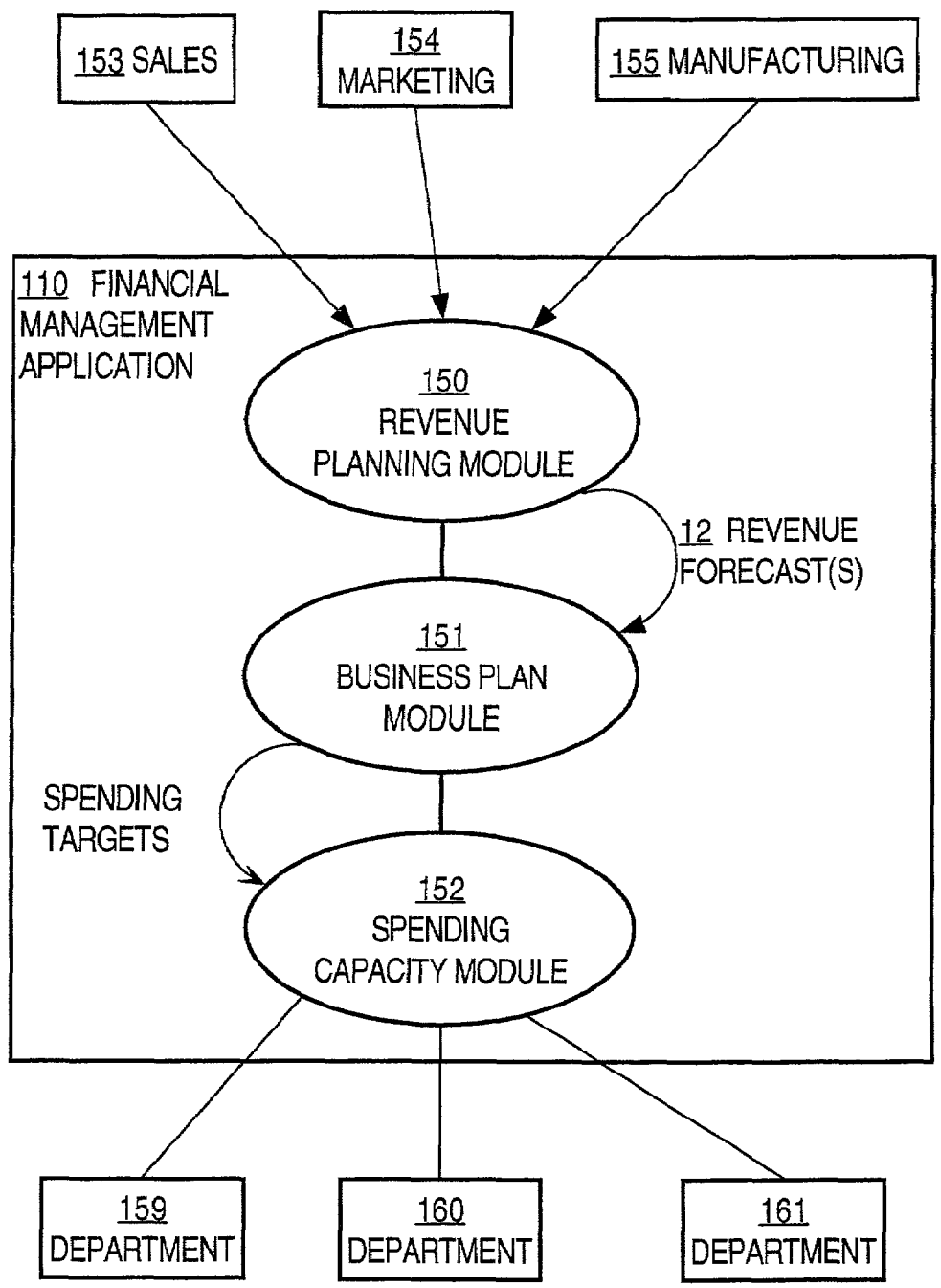
FIG. 1B is a block diagram that illustrates one embodiment of the Financial Management application of FIG. 1A.

FIG. 1B is a block diagram that illustrates one embodiment of the Financial Management application of FIG. 1A. In this embodiment, Financial Management application 110 comprises a Revenue Planning module 150, a Business Plan module 151, and a Spending Capacity module 152. The Revenue Planning module 150 receives input providing revenue forecast values and actual revenue values for a business from one or more organizations focused on revenue generation, such as sales organization 153, marketing organization 154, manufacturing organization 155, etc. Any department or other element of the enterprise may provide such input.

Revenue Planning module 150 is communicatively coupled, directly or indirectly using one or more networks, to a Business Plan module 151. Using this communication, Revenue Planning module 150 dynamically provides revenue forecast information to the Business Plan module 151 for use in profit and loss ("P&L") statements, balance sheets and statements of cash flows that are created and managed using the Business Plan module. The revenue forecast information that is communicated from Revenue Planning module 150 to Business Plan module 151 might be organized by product, by customer, etc. Business Plan module 151 may retrieve the latest revenue forecast information at any time and may refresh the financial planning information that it provides, using business rules and constraints.

Business Plan module 151 is also communicatively coupled, directly or indirectly through one or more networks, to Spending Capacity module 152. In this arrangement, Business Plan module 151 receives expense information from Spending Capacity module 152 and provides spending target values, or spending capacity values, to the Spending Capacity module 152. One or more departments 159, 160, 161 are communicatively coupled to Spending Capacity module 152 directly or indirectly through one or more networks and access the Spending Capacity module to manage spending plans and budgets, request increases in spending capacity values, etc. Managers of departments 159, 160, 161 or other users may operate Spending Capacity module 152 to periodically roll up spending plans to Business Plan module 151 for validation by the Business Plan module and for review and approval by higher-level managers. In validation, in general, privately created department spending plans are compared to spending target values established using Business Plan module 151, and the department spending plans may not become public if the spending target values are exceeded.

Spending Capacity module 152 may have other functions and features, which are not critical. In one embodiment, Spending Capacity module 152 may comprise SpendCap Manager, commercially available from Closedloop Solutions, Inc., of Redwood City, Calif. In another embodiment, Spending Capacity module 152 has the structure and functions that are disclosed in application Ser. No. 09/804,851, filed Mar. 31, 2001.

The main electronic financial statements that are planned using Business Plan module 151 are one or more P&Ls. Based on the revenue forecast information that is received from Revenue Planning module 150, a user may set spending targets within the context of a P&L. The user may set the spending targets either at a high level with respect to top-level P&L lines, or at a lower level by drilling down to sub-lines of the P&L top-level lines. For example, under the Sales & Marketing line of the P&L may have a Sales—USA line, Sales—International line, and Corporate Marketing line. Spending targets may be established for them by selecting a more detailed view and providing values for each such group. The spending target values are automatically updated as spending capacity values by Spending Capacity module 152 and thereby operate to restrict spending plans of lower-level departments.

This architecture enables the departments such as sales organization 153, marketing organization 154, manufacturing organization 155, etc., to contribute revenue values based on their view of revenue-generating operations, without accessing or interfering with higher-level business planning operations. In one specific embodiment, such as sales organization 153, marketing organization 154, manufacturing organization 155, Revenue Planning module 150 and Business Plan module 151 are communicatively coupled using a public packet-switched network such as the Internet.

Figure 2A:
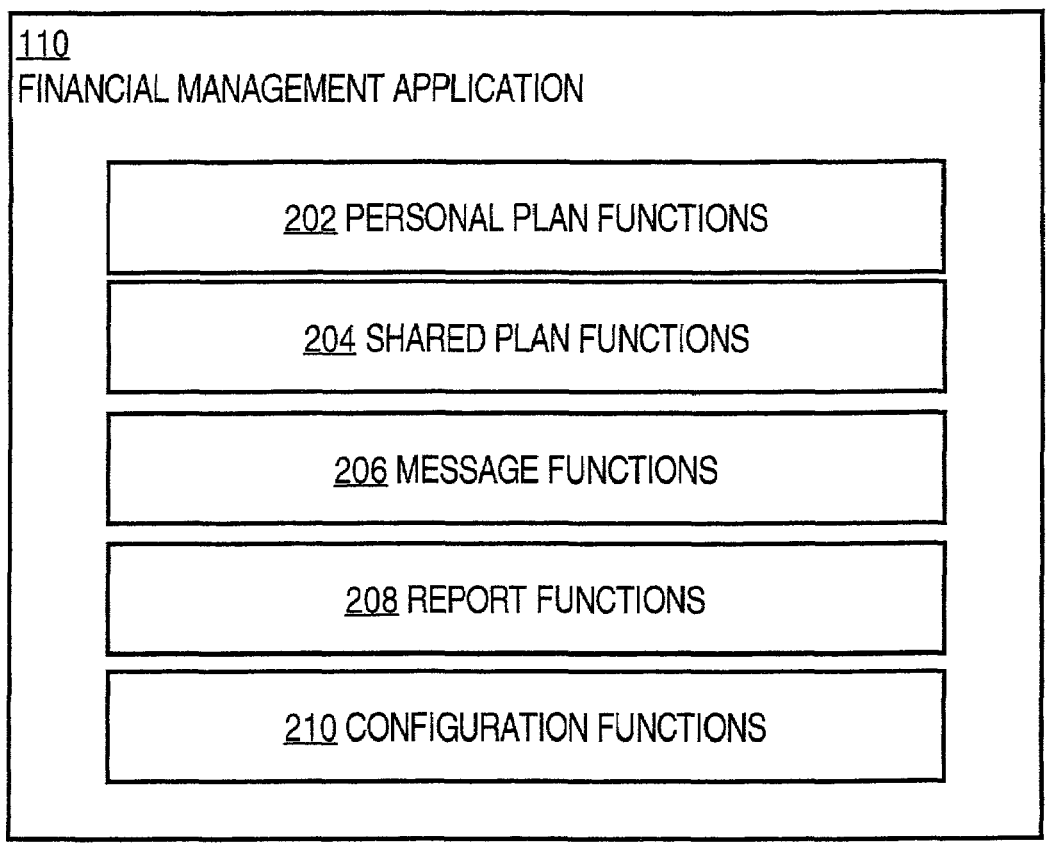
FIG. 2A is a block diagram that illustrates an architecture of the Business Plan module, in one example embodiment.

FIG. 2A is a block diagram that illustrates architecture of the Business Plan module, in one example embodiment. In this embodiment, Business Plan module 151 may comprise personal plan functions 202, shared plan functions 204, message functions 206, report functions 208, and configuration functions 210.

In general, personal plan functions 202 involve creating, storing, modifying, and managing one or more personal financial plans in a private planning area. In this context, a personal financial plan is a plan for a department in which a user participates and that no others in the enterprise can access. The plan may comprise a linked set of a P&L, balance sheet and statement of cash flows, as described herein. If desired, the user may publish the personal plan to others in the enterprise, placing it in a shared planning area that is managed by shared plan functions 204. Any users with access to the shared planning area, who are typically higher-level corporate managers, can view information contained in a shared plan. Generally, the private planning area and shared planning area have an identical appearance and method of navigation, except that a user cannot edit data that is displayed in the shared plan. Multiple scenarios may be displayed in both the private planning area and shared planning area, as further described herein.

Publishing a private plan to the shared planning area replaces all information associated with all scenarios in the older public plan with the new information, including all scenarios in the P&L, balance sheet and statement of cash flows. The P&L has enough information to determine spending capacity levels for all top-level departments in an enterprise hierarchy. Accordingly, in an embodiment, publishing a plan automatically causes Financial Management application 110 to update spending capacity assignments. Such updates may be carried out by sending spending capacity values from Business Plan module 151 to Spending Capacity module 152, which updates each spending capacity that it manages.

In one specific embodiment, publishing a plan is achieved by selecting a Publish button in a screen display. For example, Balance Sheet 400 of FIG. 4A, which is described further below, may be published by selecting Publish button 415. In response, the foregoing publish actions are carried out, and the user is redirected to a summary page of the shared plan that corresponds to the published private plan. For example, if the user is working with a private P&L and selects the Publish button, after publication of the plan the user is redirected to a summary P&L page of the shared plan.

Publication of a private plan also results in generation of one or more messages or Actions for each top-level department that experiences a change in spending capacity assignment. Message functions 206 may provide a message in-box for messages directed to a particular user relating to that user's planning activity. Such messages may be system messages, alerts, notifications, or information messages from other users. Report functions 208 involve generating one or more reports from data that is managed by the system. Configuration functions 210 generally involve configuring data structures, modeling relationships and other administrative features and functions.

Figure 2B:
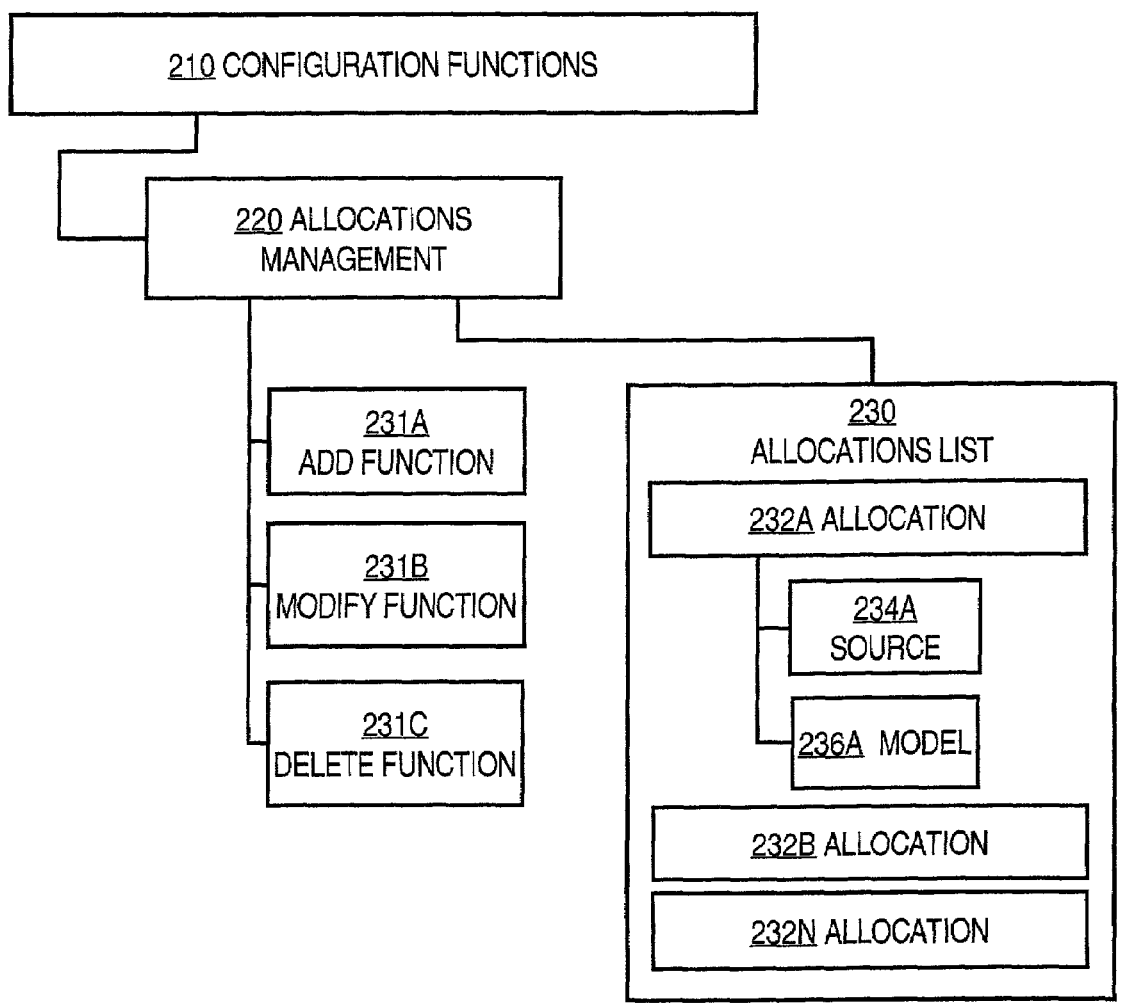
FIG. 2B is a block diagram that illustrates a configuration function of the application of FIG. 2A.

FIG. 2B is a block diagram that illustrates a configuration function of the application of FIG. 2A. Configuration functions 210 may comprise, in one example embodiment, an allocations management function 220, which is described in the next section of this description.

Business Plan module 151 may have other functions and features, which are not critical to the invention described herein. In one embodiment, the Business Plan module of the Financial Management application may comprise BizPlan Manager, commercially available from Closedloop Solutions, Inc., of Redwood City, Calif.

In this configuration, Revenue Planning Module 150 is used to create and store a revenue forecast 12. Revenue values from the revenue forecast 12 may be retrieved by Business Plan Module 151 and stored in revenue line items of one or more financial plans. For example, sales revenue values from revenue forecast 12 are entered as sales revenue line items in a profit-and-loss ("P&L") statement that is managed by Business Plan Module 151.

The Business Plan Module 151 may generate one or more spending target values ("spending capacity values" or "spend caps") that are provided directly or indirectly to Spending Capacity Module 152. Users of Spending Capacity module 152 may create one or more spending plans that are validated against the spending target values received from Business Plan Module 151. If the spending plans do not exceed the spending target values that were developed using Business Plan Module 151, users may publish the spending plans, and may roll up values created in the spending plans and provide the rolled-up values to other users of Business Plan Module 151.

In one embodiment, each P&L statement that is managed using Business Plan Module 151 is linked to a corresponding balance sheet and statement of cash flows.

In addition, Business Plan Module 14 may manage a plurality of P&L statements that relate to different entities within an enterprise hierarchy. For example, if an enterprise hierarchy comprises a Corporate node that has, as child nodes, an Alpha Business Unit and Beta Business Unit, then the Business Plan Module 14 may manage a Corporate P&L, Alpha P&L, and Beta P&L. Similarly, the Business Plan Module 14 may manage a financial plan for departments or other organizations that are subordinate to each business unit. If such departments generate expenses only and not revenue, then the financial plans for the departments are structured as contribution statements rather than P&L's. FIG. 10, described further herein, is an example of a contribution statement or P&L.

Each lower-level contribution statement or P&L is linked to a higher-level P&L by logical associations in a database among line items of the statements and P&L's. Using such linkages, as described further herein, roll-ups may be carried out so that contributions to profit or loss of one department or business unit are carried upward into higher-level P&L statements.

Use of the Financial Management application 110 is facilitated by definition and use of a plurality of planning entities. In this context, "planning entities" are organizational groups within the company that is planning information in the system. In one embodiment, planning entities comprise "Corporate," one or more Business Units, one or more Rollup Departments, and one or more Cost Centers. The planning entities are organized in one or more organizational hierarchies that are represented by data stored in database 112. The structure and use of such hierarchies is described herein in the next section.

In one embodiment, each hierarchy comprises a plurality of nodes, designated as "profit centers" and as "spending departments." Nodes that are "profit centers" are responsible for (and plan for) both revenues and spending. Nodes that are "spending departments" only spend money and therefore do not plan for revenues. All "profit centers" can use the techniques disclosed herein to plan one or more integrated sets of financial statements such as a P&L, balance sheet and cash flow statements. In one specific embodiment, the profit centers comprise two types; one top-level node is termed the "Corporate" node, and lower-level nodes are termed "Business Units." In certain embodiments, the names of such nodes can be changed, but for purposes of illustrating a clear example, the terms "Corporate" and "Business Unit" are used herein. For example, a Business Unit can alternately be termed a Division, a Branch, a Region, etc.

The "Corporate" node is always the top-level planning entity in the departmental hierarchy. A system administrator can change the name of the top-level planning entity to something else, but in this document, for clarity, the top-level planning entity is referred to as Corporate. Business units always report to Corporate, or to other Business Units, thus creating a hierarchy of Business Units.

Among spending departments, there are two types: "rollup departments" and "cost centers". Rollup departments can report to other rollup departments, to a business unit, or directly to Corporate, depending upon how your company is structured. Cost centers normally report to rollup departments, but may report directly to a business unit or Corporate.

In this context, a business unit is an organizational node that is a profit center and is not the Corporate node, and which plans a contribution P&L instead of simply setting spending capacity for its child departments, as other parent departments do. A business unit plans a contribution P&L using Business Plan module 151, while a rollup department plans using a Spending Capacity Assignment page in Spending Capacity module 152. Corporate sets spending and revenue targets for each business unit, and the parent of a rollup department (whether Corporate, a business unit, or another rollup department) sets spending capacity for the rollup department. Thus, a business unit has considerably more autonomy within the company, and greater control over its spending levels, than a rollup department. A business unit identifies an organizational element that contributes a profit or loss to the overall enterprise and generates revenue and expenses, as distinguished from certain departments that solely generate expenses and are not involved in generating revenue.

A spending target is a non-binding spending goal set by Corporate or a higher-level business unit for a child business unit. A business unit can plan to spend less or more that the target suggests. Similarly, a revenue target is a non-binding revenue goal set by Corporate or a higher-level business unit for a child business unit. A business unit can plan to generate less or more revenue than the target suggests. On the other hand, a spending capacity value is a mandatory limit set by a parent department (Corporate, a business unit, or another department) for a child department. In one embodiment, validation checks are applied to private plans of child departments when the plans are published, so that the child departments cannot plan to spend more than the spending capacity value allows. In an alternative embodiment, the validation checks may be turned off for some or all the spending departments.

Thus, embodiments may be used in the context of a system providing revenue-driven reallocation of spending resources is facilitated. In such a system, revenue forecast information is captured. The process of allocating spending capacity values among a plurality of spending parties is automated, based on the latest revenue forecast, in order that an organization is able to achieve its desired profitability objectives. A set of related pro-form a financial statements are generated, including P&L statements, balance sheets, and statements of cash flows.

(2) Hierarchical Planning Environment and Hierarchial Roll-Ups

An enterprise may forecast a hierarchy of contribution P&Ls, with associated Balance Sheets and Statements of Cash Flows, corresponding to a hierarchy of business units of the enterprise. The contribution P&Ls may have any number of hierarchical levels as long as the revenue and department levels of the enterprise match. The contribution P&Ls may be consolidated in one or more roll-up P&Ls according to a defined hierarchy. While the consolidated views provided by the roll-up P&Ls are beneficial, a need for alternative views may also exist. For example, a manager may desire to create, modify and manage a roll-up of P&L values relating to only all domestic activities, across all business units, or only all international activities. Therefore, embodiments support creation of multiple hierarchies, any of which may be selected and used to generate roll-ups reflecting different views.

Figure 3A:
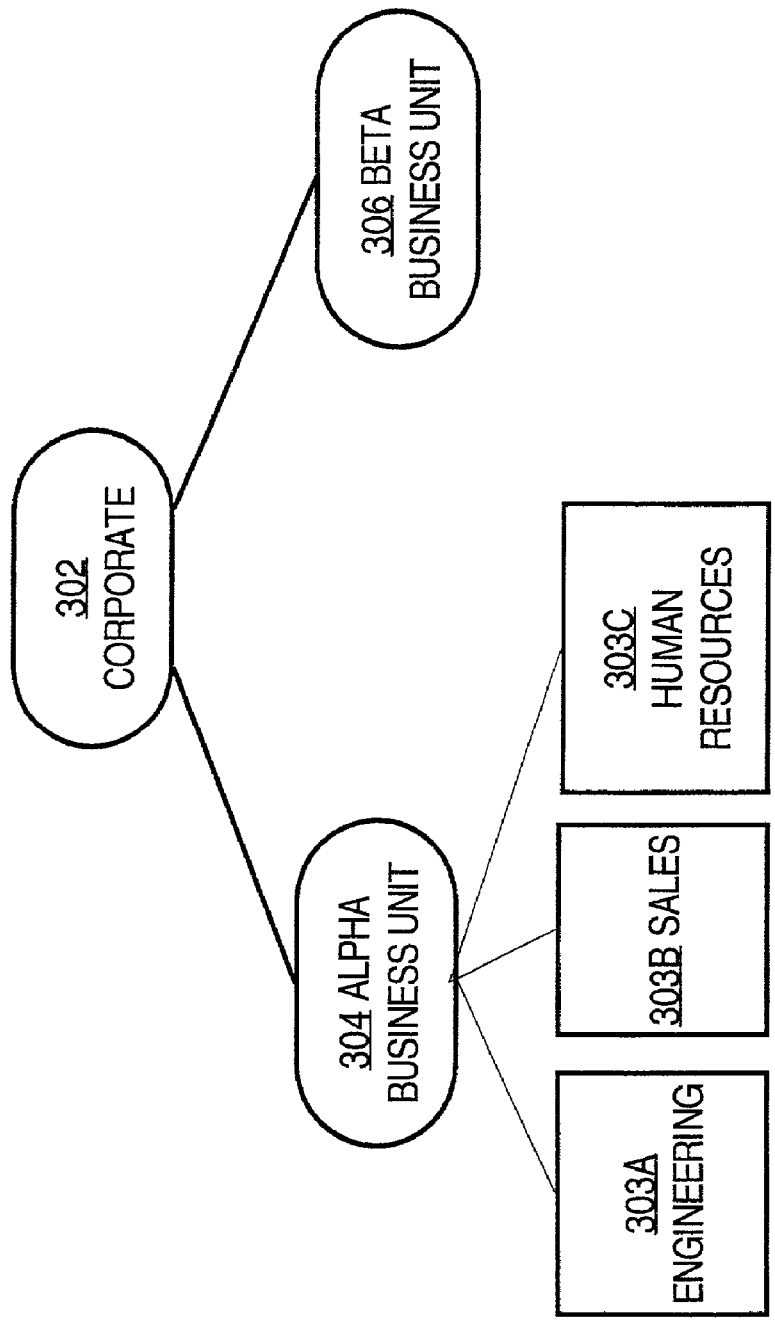
FIG. 3A is a block diagram of an example of an organizational hierarchy for a business enterprise.

FIG. 3A is a block diagram of an example of an organizational hierarchy for a business enterprise. The enterprise comprises a Corporate node 302, Alpha business unit 304, and Beta business unit 306. Each business unit 304, 306 may have one or more departments or other child nodes that relate to functions within the business unit. For example, each business unit 304, 306 may have an Engineering department, Sales Department, Marketing Department, Human Resources department, etc. Another example of a department hierarchy is set forth in Table 1:

TABLE 1

EXAMPLE DEPARTMENT HIERARCHY

Corporate (c)
    BU Hardware (1000)
        HW GA (1100)
        HW Finance (1110)
        HW Human Resources (1120)
        HW Manufacturing (1300)
            HW Coating (1320)
            HW Coupler (1330)

TABLE 1-continued

EXAMPLE DEPARTMENT HIERARCHY

HW Production (1310)
 HW Marketing (1200)
  HW Product Management (1210)
  HW Product Marketing (1220)
 HW QC (1500)
 HW RDE (1400)
  HW Components (1420)
  HW Design (1430)
  HW Platform (1410)
 HW Services (1600)
  HW Professional Services (1610)
  HW Support (1620)
BU Software (2000)
 SW GA (2400)
  SW Finance (2410)
  SW Human Resources (2420)
 SW Marketing (2300)
  SW Product Management (2310)
  SW Product Marketing (2320)
 SW QA (2100)
 SW RDE (2200)
  SW Applications (2220)
  SW Integration (2230)
  SW Operating Systems (2210)
 SW Services (2500)
  SW Professional Services (2510)
  SW Support (2520)
Corporate Marketing (9200)
 Corporate Development (9220)
 Marketing Communications (9210)
GA (9100)
 Facilities (9110)
 Finance (9120)
 HR (9130)
 Information Technology (9150)
 Investor Relations (9140)
Sales (9300)
Asia Pac (9500)
 Australia (9520)
 Japan (9510)
Europe (9600)
 England (9630)
 France (9610)
 Germany (9620)
 Italy (9640)
North America (9400) Sales
 Canada (9410) Sales
 US East (9420) Sales
 US West (9430)

The hierarchies of FIG. 3A and Table 1 are examples of a first primary hierarchy of an organization. In one embodiment, generating roll-ups is facilitated by a revenue hierarchy. The revenue hierarchy is also a primary hierarchy. Thus, in an embodiment, primary hierarchies include the organization (department) hierarchy and the revenue hierarchy. These hierarchies have certain common components, such as the top node or "Corporate" node, as well as all the profit centers that report to each other in the same way for both hierarchies. However, the organization hierarchy also has spending departments and represents how they report to Corporate and the Business Units, while the revenue hierarchy has detailed revenue nodes and represents how they report to Corporate and the Business Units.

The revenue hierarchy is represented by stored data in database 112. The revenue hierarchy provides a mapping of how to generate roll-ups. An example of a revenue hierarchy is set forth in Table 2:

TABLE 2

REVENUE HIERARCHY

Corporate
 BU Hardware
  Orion
  Pegasus
  Storm
  Centaur
  Hardware Services
   HW Professional Services
   HW Customer Support
 BU Software
  Spitfire
  Atlas
  Lightning
  Software Services
   SW Professional Services
   SW Customer Support Services The revenue hierarchy identifies business units and other nodes that contribute revenue in the organization. Nodes of the revenue hierarchy are configured by user action.

An alternate hierarchy may be created and stored by an administrative user using a configuration page that is provided by Financial Management application 110. The specific mechanism for creating and storing an alternate hierarchy is not critical, and can be similar to that for creating and storing the primary organization hierarchy. An example of creating hierarchies is described further herein with respect to FIG. 11A and FIG. 11B. What is important is that a user has a way to map nodes of the primary organizational hierarchy to one or more alternate hierarchies and can use the alternate hierarchies to generate roll-ups of P&Ls or other electronic financial statements.

In one specific embodiment, an administrative user defines the alternate hierarchy and assigns one or more other users to selected nodes of the alternate hierarchy. By assigning such users, the administrative user enables such users to plan financial statements that are associated with the selected nodes to which the users are assigned.

Figure 3B:
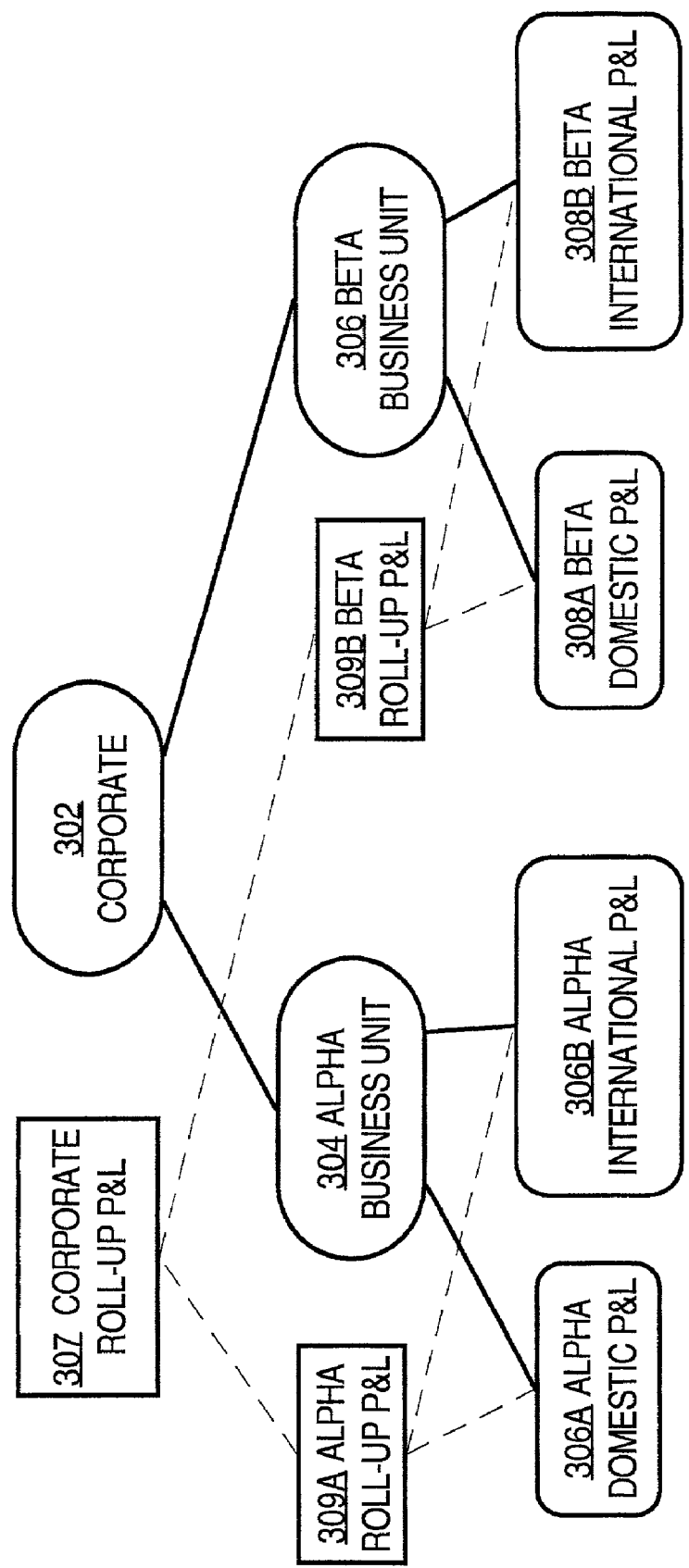
FIG. 3B is a block diagram of electronic financial plan documents that may be created, linked, modified, and managed to provide roll-up views.

FIG. 3B is a block diagram of electronic financial plan documents that may be created, linked, modified, and managed to provide roll-up views. For purposes of illustrating an example, assume that the Alpha business unit 304 and Beta business unit 306 of FIG. 3A are involved in both domestic and international sales and related activities. Therefore, the Alpha business unit 304 creates and manages a domestic P&L 306A relating to its domestic business, and an international P&L 306B relating to its international business. Similarly, the Beta business unit 306 creates and manages a domestic P&L 308A relating to its domestic business, and an international P&L 308B relating to its international business.

To create a consolidated view or consolidated statement of the profit and loss position of the Alpha business unit across both geographic regions, an Alpha roll-up P&L 309A is created and stored, which contains values rolled-up from both the domestic P&L 306A and international P&L 306B of Alpha. Similarly, to create a consolidated view or consolidated statement of the profit and loss position of the Beta business unit, a Beta roll-up P&L 309B is created and stored, which contains values rolled-up from both the domestic P&L 308A and international P&L 308B of Alpha. The Alpha roll-up P&L 309A and the Beta roll-up P&L 309B may be rolled up into a corporate roll-up P&L 307 that provides a view of the profit and loss position of the entire enterprise.

According to an embodiment, each business unit of an enterprise plans a P&L that is called a contribution P&L. In this context, a "contribution P&L" is one that contributes to higher-level values and excludes values for lines that are not relevant for an internal P&L, including "other" income and expense, taxes and share count.

FIG. 10 is a diagram of a contribution P&L, in one example embodiment. In this example, contribution P&L 1000 comprises a plurality of planning lines 1002 each having values associated with one or more accounting periods 1004. The accounting periods may be months, quarters, years, etc. In general, the accounting periods include at least one accounting period in the future that is associated with planned data, and in this sense the P&L 1000 is forward-looking. The lines 1002 may include hyperlinks that enable a user to retrieve a more detailed view of a hierarchy to which the lines belong. For example, selecting Revenue line 1008 causes the system to generate a display of contribution P&L 1000 that includes all departments that contribute to revenue in a position hierarchically below and adjacent to Revenue line 1008.

Lines 1002 comprise revenue lines and expense lines relating to operating expenses of the business unit that is represented in the P&L. The lines 1002 exclude values for "other" income and expense, taxes and shares that are found in the Corporate P&L. The bottom line of the contribution P&L 1000 is a Contribution line 1020 that summarizes the contribution of the associated business unit to enterprise-wide income or expense.

Contribution P&L's may be combined (rolled up) in a consolidated company P&L through hierarchies other than the hierarchy in which the separate contribution P&L's are natively or originally organized. Thus, alternate hierarchies may be used for reporting purposes. Leaf departments for spending and leaf revenue elements are mapped into the alternate hierarchies as appropriate. Each lower-level contribution statement or P&L is linked to a higher-level P&L by logical associations in a database among line items of the statements and P&L's. Using such linkages, roll-ups may be carried out so that contributions to profit or loss of one department or business unit are carried upward into higher-level P&L statements.

Generally, an administrative user creates and stores a primary hierarchy for a company using Financial Management application 110. One or more alternate hierarchies may be created and stored, enabling other users to generate roll-ups along the alternate hierarchies.

FIG. 3C is a block diagram of electronic financial plan documents that may be created, linked, modified, and managed to provide roll-up views across business units. To create a consolidated view or consolidated statement of the profit and loss position of domestic activities across both business units, a domestic roll-up P&L 310 is created and stored, which contains values rolled-up from both the P&Ls 306A, 308A. Similarly, to create a consolidated view or consolidated statement of the profit and loss position of international business across business units, an international roll-up P&L 312 is created and stored, which contains values rolled-up from both the international P&Ls 306B, 308B.

FIG. 3E is a diagram of a P&L as displayed in one example embodiment. In this example, a P&L 320 comprises a plurality of lines 352-368 each associated with accounting period columns 340A, 340B, 340C, etc. In general, the accounting periods include at least one accounting period in the future that is associated with planned data, and in this sense the P&L 320 is forward-looking. Each of the lines 352-368 is associated with a label, that may be a hyperlink and that identifies the name of the line. In one embodiment, a user may rename one or more of the lines in a configuration function, so that custom labels may be applied to lines.

To read a P&L, a user may sign on to Financial Management application 110 with identification as a business owner or owner of a business unit. In response, Financial Management application 110 directs the user to Business Plan module 151, and generates a display of an appropriate Shared Plan summary page for a business unit or business associated with the user. For example, if application 110 knows that the user is a department manager, a spending resource manager or spending capacity display is generated. If the user is a roll-up department manager or higher-level manager, a P&L is displayed. FIG. 3E is a diagram of an example of a P&L summary page.

In the Gross Profit section, a user may select the Revenue hyperlink 352 to display projected sources of revenue of the associated company or business unit. Within one or more Revenue detail pages, the user is presented with information about where the company or business unit's revenues are expected to come from, how various products are selling, etc. To access a display of detailed values for any line item, a user may select an associated hyperlink. If the line item is not hyper-linked, no greater detail is available for it.

In the Gross Profit section, a user may select the COS line 354 hyperlink to display projected costs of sales of the company or business unit. In response, within one or more COS detail pages, the user is presented with information about how much the company or business unit plans to spend to produce products, in Revenue-Driven COS and Other COS lines. To access the detail for any line item, a user may select the hyperlink for that line. If the line item is not hyper linked, there is no greater level of detail available for it.

A user may select any hyperlink in the Operating Expenses section, e.g., G&A link 360, R&D link 358, Sales & Marketing link 362, etc., to display the detail page for that line item. In response, a corresponding Operating Expense detail page is generated. Within the Operating Expenses detail pages the user is presented with details about how much the company or business unit is spending for overhead expenses, such as Administration, Legal, Marketing, R&D, Sales, and so on.

If P&L 320 is a corporate P&L, in the Net Income section, a user may select the Other Income/Expense hyperlink 366 to view details of other income that the company expects to receive, and other expenses it expects to incur. Also in the Net Income section, a user may select the Tax hyperlink 367 to view details of the taxes the company expects to pay. If P&L 320 is a business unit P&L, no Net Income section is displayed in it, and thus there is no hyperlinks 366, 367.

A user may view a summary of issued shares and earnings per share ("EPS") for the company on P&L 320 in Shares and EPS line 372. If P&L 320 is for a business unit, no shares or EPS lines are displayed.

Each section of P&L 320 rolls up to a summary figure, shown in a line item at the bottom of the section. For example, Gross Profit line 356 is a rollup of lines 352, 354 that comprise the gross profit section, and Operating Expense line 364 is a rollup of lines 358, 360, 362 that comprise the operating expense section. Net Income line 368 shows the net profit that the company or business unit expects to receive.

To plan a P&L statement, a user logs on as a Corporate user or as an owner of a Business Unit, and selects the private work area. If the user logged on as Corporate, the P&L statement for the entire company is displayed. If the user logged on as a Business Unit, the P&L statement for that business unit is displayed. In general, the P&L that is displayed in either case resembles P&L 320 of FIG. 3E. The user selects a line of interest, and provides successive user input to select additional lower-level lines until a specific line of interest is reached. When user input is received to select successively lower lines in the hierarchy, and a lowest-level line is reached, Financial Management application 110 generates and provides a planning page that includes data entry fields for the line.

Figure 3D:
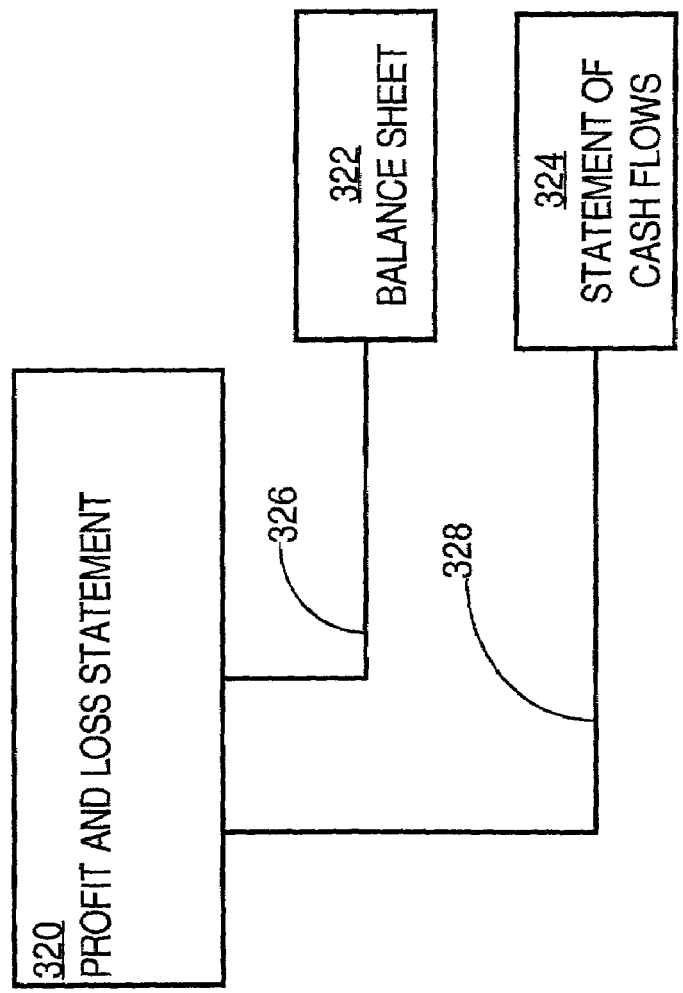
FIG. 3D is a block diagram illustrating a P&L that is linked to a balance sheet and statement of cash flows.
Figure 3F:
FIG. 3F shows a screen display of an example corporate P&L in the private planning area showing data entry fields for entering target values in one example embodiment.

FIG. 3F is a diagram of a screen display of an example corporate P&L in the private planning area showing data entry fields for entering target values. The target value page comprises a plurality of data entry fields for the line item for future accounting periods. In this example, private P&L 370 comprises data entry fields 372A, 372B, etc. for G&A detail lines 360A, 360B, etc. The detail lines 360A, 360B roll up into to G&A line 360 of P&L 320 of FIG. 3E. Each of the data entry fields 372A, 372B, etc., is associated with one of the accounting periods 340A, 340B, etc., of FIG. 3B. Any data values that have been previously entered are displayed in the data entry fields. To establish a target values for the associated line, the user then enters revenue, cost of sales, and operating expenses for the company or business unit for one or more accounting periods by entering data values in the appropriate data entry fields. To provide background, or a basis for planning future revenues and expenses, historical values for the same lines ("actuals") can be imported into the financial management system, where they are displayed side-by-side with plan data, thus making it is easier for the user to use the historical data as context.

For purposes of illustrating an example, FIG. 3F shows a P&L with data entry fields for target values. However, target values also may be entered in a balance sheet and statement of cash flows in a similar manner.

The user may select a hyperlink to access the other income and expenses detail pages and fill in other anticipated income and expenses of the company or business unit. When the values look as they should, the user may select an Update link 374 to save the work and stay on the same page, or the user may select a Done link 376 to save the work and return to the top-level P&L page. Similar steps are used to access the taxes detail page, provide tax rate values, etc. The tax rate and/or tax adjustment is entered as a whole number and represents the estimated total impact of all taxes on the company.

When the user has finished modifying the private P&L statement, the user may select a Publish button to publish the private plan to the shared planning area. In response, the changes are made to the shared plan in the database, and the user is redirected to the shared planning area, where the user and others with access can view the new plan.

In this configuration, contributing P&Ls from business units and roll-up P&Ls form one or more hierarchies that logically overlay the general organizational hierarchy of an enterprise. Links among P&Ls facilitate carrying out roll-ups. As a result, the Financial Management application 110 provides a hierarchical planning environment.

Roll-ups may reveal that detailed plans of departments may be less than or greater than the spending targets that have been established for such departments by the P&L. To reveal such information, a "bottom-up" P&L may be generated. In this context, a bottom-up P&L is a P&L similar to P&L 320 of FIG. 3E that is generated by combining values that have been entered in all lower-level P&Ls. For example, referring now to FIG. 3C, a bottom-up P&L may be generated in the logical position of corporate roll-up P&L 307. The bottom-up P&L is generated by retrieving, from Spending Capacity module 152, all spending values that have been planned by the leaf-level departments, such as all those departments logically below Alpha business unit 304 and Beta business unit 306 in the corporate department hierarchy, and aggregating them in a single P&L electronic document. In this way, a user may view the spending plans that have been created by the departments and create a pro form a P&L that reveals the effect of such spending plans if they are made actual. This bottom-up P&L may be compared to a company-wide P&L that has been prepared by upper-level management, and any differences or conflicts among them may be reported or worked out. In addition, the corporate-wide P&L may be modified to adopt values that are obtained through roll-ups, enabling information to flow from the bottom up in the organization.

FIG. 11A is a diagram of a screen display that may be used to modify a department hierarchy. In one embodiment, a department hierarchy is initially loaded into Financial Management application 110 in the form of a configuration file, such as a comma-delimited data file, that defines nodes of the hierarchy and at least one parent node of each node. After the hierarchy is initially configured, a user may modify the department hierarchy in the following way. The user accesses Financial Management application 110 and selections configuration functions 210. In response, Financial Management application 110 displays a list of available configuration functions, which include a Department Management function. The user selects the Department Management function. In response, Financial Management application 110 displays the then-current department hierarchy, in a format similar to that of Table 1, with each department name styled as a hyperlink.

The user selects the link corresponding to the department name. In response, Financial Management application 110 generates and provides an Update Department page 1102 (FIG. 11A) to the user. The name of the selected department is displayed in Department Name field 1104. The user may change the name of the department by editing the text in field 1104. The user may designate the department as a business unit by selecting check box 1106. To change the relative position of a department in the hierarchy, the user selects a different parent department using pull-down menu 1108. The user may also modify other metadata pertaining to the selected department by entering or selecting values in fields 1110, 1112, 1114, etc.

An account list 1116 identifies expense accounts within the selected department. A user may add accounts to list 1116 by selecting Accounts link 1117 and may remove an existing account by selecting its associated Remove link 1118.

When all data is modified to the satisfaction of the user, the user may select a Done link 1120 to store the updated values in database 112. Alternatively, the user may return to the department hierarchy display without entering changes by selecting Cancel link 1122, or may delete the department from the hierarchy by selecting Delete link 1124.

Figure 11B:
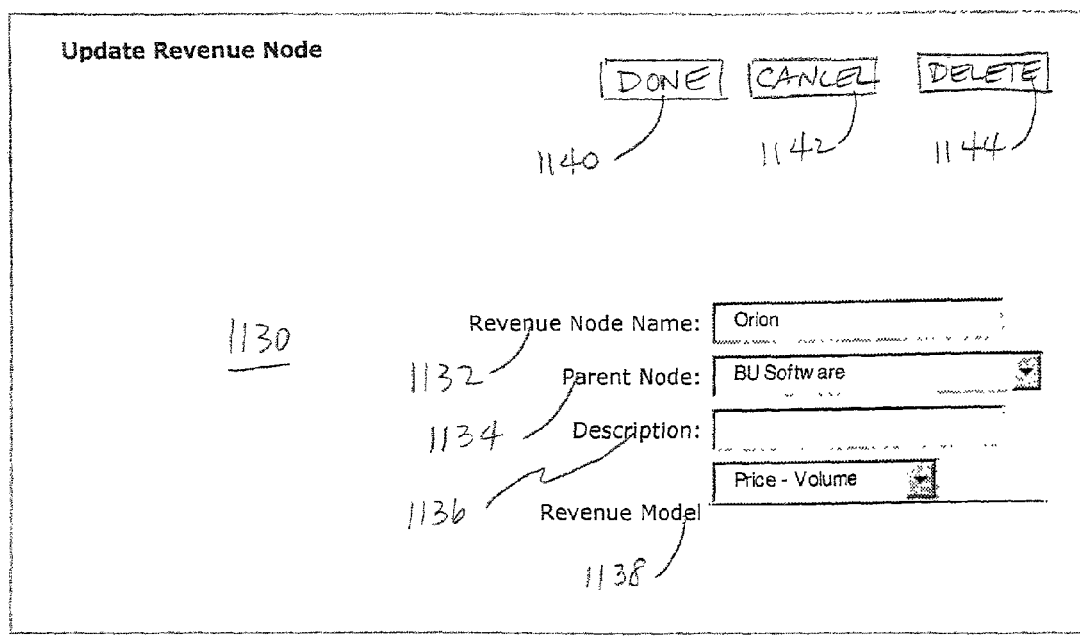
FIG. 11B shows a screen display that may be used to modify a alternate hierarchy in one example embodiment.

FIG. 11B is a diagram of a screen display that may be used to create and modify a revenue hierarchy. After the hierarchy is initially configured, a user may modify the hierarchy in the following way. The user accesses Financial Management application 110 and selections configuration functions 210. In response, Financial Management application 110 displays a list of available configuration functions, which include a Revenue Hierarchy Management function. The user selects the Revenue Hierarchy Management function. In response, Financial Management application 110 displays the then-current revenue hierarchy, in a format similar to that of Table 2, with each node in the hierarchy styled as a hyperlink that is identified by a business unit name or department name.

The user selects the link corresponding to the node name. In response, Financial Management application 110 generates and provides an Update Revenue Node page 1130 (FIG. 11B) to the user. The name of the selected department is displayed in Revenue Node Name field 1132. The user may change the name of the alternate hierarchy node by editing the text in field 1132. To change the relative position of a node in the hierarchy, the user selects a different parent node using pull-down menu 1134. The user may also modify other metadata pertaining to the selected department by entering or selecting values in fields 1136, 1138, etc.

When all data is modified to the satisfaction of the user, the user may select a Done link 1140 to store the updated values in database 112. Alternatively, the user may return to the department hierarchy display without entering changes by selecting Cancel link 1142, or may delete the department from the hierarchy by selecting Delete link 1144.

In one embodiment, the hierarchy display pages also include an Add button that a user may access to add a node to a hierarchy, in a manner similar to the foregoing.

Spending target values that are set for contribution P&Ls are not subjected to validation in the manner of department spending plans. In a department, the total spending of the department is the key value in the spending plan with respect to validation. However, in a contribution P&L, the key value may be the contribution line 1020, or any of the lines 1002. For example, an enterprise may wish to set a target for revenue growth, and therefore conformance to that target by the Revenue line 1008 is subject to special scrutiny, whereas overall spending by the contributing business unit is of less concern.

To address this concern, in one embodiment, a user may configure a P&L 320 with target values for Revenue line 352. Indirectly, such a target value acts as a target value for all business units that contribute to Revenue line 352, because all such business units are expected to meet or exceed the target value. Also in an embodiment, similar target values may be configured for all other lines of P&L 320. Thus, to the extent that contribution P&Ls contribute to such lines, target values that are set for such lines in P&L 320 indirectly act as goals and restrictions on lower-level P&Ls that are related to P&L 320 in a roll-up hierarchy. This mechanism enables a higher-level manager to set goals for revenue growth, gross margins, and similar concepts for other P&Ls that are related in a hierarchy.

Figure 12:
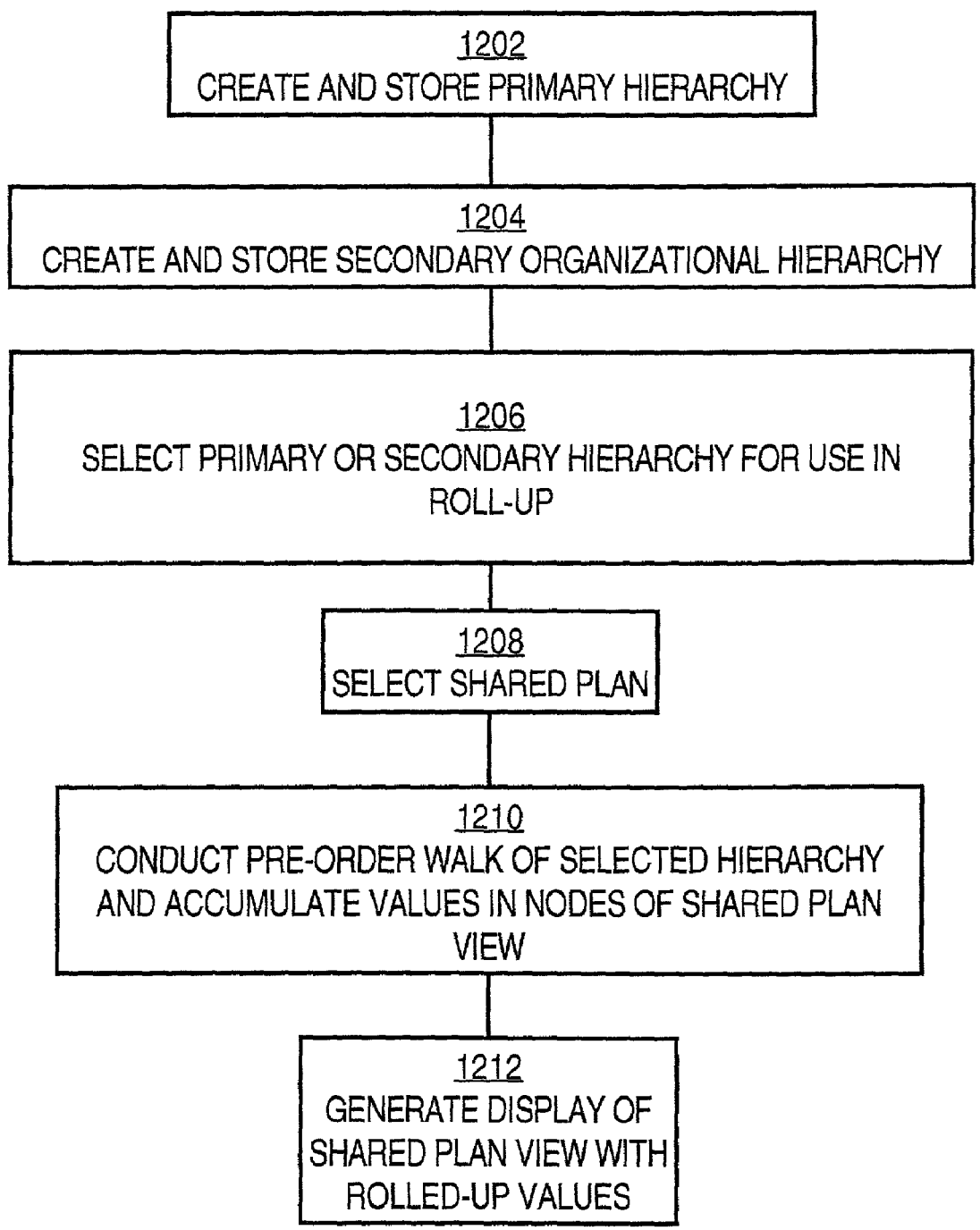
FIG. 12 is a flow diagram of a method of generating a roll-up along the primary or an alternate hierarchy.

FIG. 12 is a flow diagram of a method of generating a roll-up along an alternate hierarchy.

In block 1202, a primary hierarchy is created and stored. In one embodiment, the primary hierarchy is a department hierarchy of the form shown in Table 1. In block 2, an alternate hierarchy is created and stored.

In block 1206, the primary hierarchy or alternate hierarchy is selected. The selected hierarchy is used in generating roll-up views, reports, or displays of one or more electronic financial plan documents, such as P&Ls, balance sheets, or statements of cash flows. The hierarchy may be selected, for example, by user input in a page display of one of the electronic financial plan documents. In one specific embodiment, for example, there is a "Change Roll-Up Hierarchy" or pull-down menu that receives user input selecting a particular hierarchy from among a set of available hierarchies.

Figure 4A:
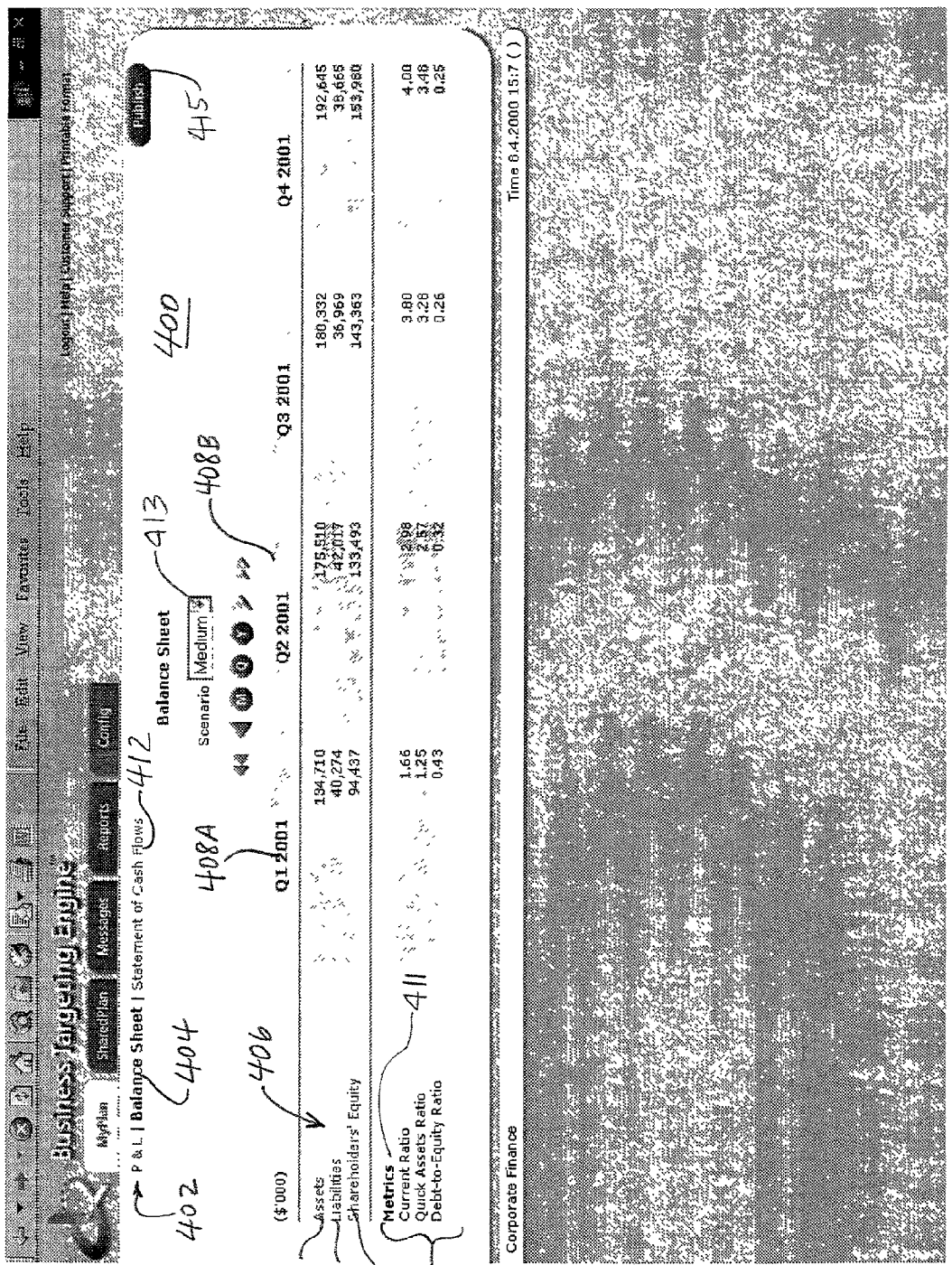
FIG. 4A shows a screen display of a balance sheet in one example embodiment.
Figure 4B:
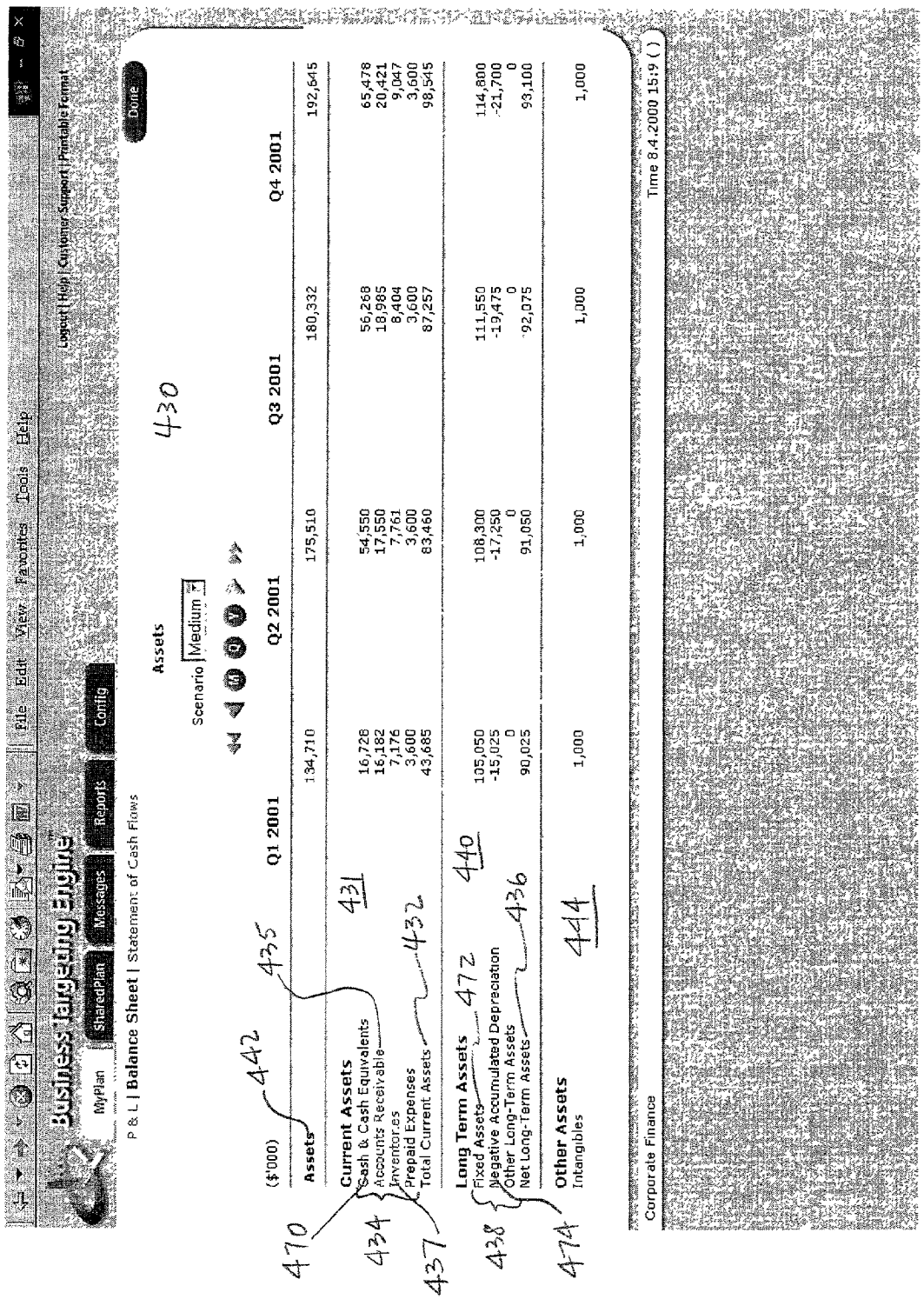
FIG. 4B shows a screen display of an assets page that may be generated, for example, in response to selecting the Assets line in the balance sheet statement in one example embodiment.

In block 1208, a shared plan is selected. For example, a user selects a P&L, balance sheet, or statement of cash flows using links 402, 404, 412 of FIG. 4A. In response, a roll-up of the selected electronic financial statement is generated based on the selected hierarchy and selected shared plan. For example, as shown in block 1210, a pre-order walk of the selected hierarchy is conducted, and values of departments at nodes of the hierarchy are accumulated during the tree walk and stored in nodes of a shared plan view. In block 1212, a display is generated of the shared plan, showing the rolled-up values. As an example, the view may have the form as shown in FIG. 3E, FIG. 4A, FIG. 4B, etc., with values that are appropriately rolled up according to the selected hierarchy.

In this manner, a user may configure a hierarchy of P&Ls. P&Ls of individual business units or regions may roll-up to a company-wide or corporate P&L. Values that are planned at a higher level are reflected as targets for those who are planning at lower levels. Further, the lower-level plans can roll up and inform the higher-level P&L about expected financial performance of the enterprise. Thus, bi-directional logical linking is provided in a way that provides great flexibility and automation in a distributed planning process.

(3) Linkages of P&L to Balance Sheet and Statement of Cash Flows

According to one embodiment, a Balance Sheet and Statement of Cash Flows are linked to P&L as well as department spending plans. As any document is updated by a user, the other two documents are automatically updated, keeping them in synchronization. As a result, all financial statements may be forecast in an integrated manner. Top-level spending authorization levels are treated as expenses; therefore, a resulting P&L forecast is conservative in terms of Net Income, in part because total spending plans cannot exceed targets set at a higher level.

FIG. 3D is a block diagram illustrating a P&L that is linked to a balance sheet and statement of cash flows. A linked combination of a P&L 320, balance sheet 322, and statement of cash flows 324 may be created and stored for every node in the hierarchy of FIG. 3B and FIG. 3C that has an associated P&L. Thus, in FIG. 3B and FIG. 3C the term "P&L" may refer to the combination of a linked P&L, balance sheet, and statement of cash flows. Further, each balance sheet and statement of cash flows of a first P&L in the hierarchy is individually linked to other balance sheets and statements of cash flows that are associated with other P&Ls, according to the same department hierarchy. This mechanism provides the user with the option and ability to plan a balance sheet and statement of cash flows in synchronization with a P&L.

Links 326, 328 logically connect the P&L 320 to the balance sheet 322 and statement of cash flows 324, respectively. Links 326, 328 represent programmatic associations of specific lines of values in the P&L 320, balance sheet 322 and statement of cash flows 324, which are detailed below. Links 326, 328 also represent automatic programmatic processes that are triggered upon a change to any of the electronic financial statements that are linked in a set. For example, when a user updates a value in statement of cash flows 324, associated linked values in P&L 320 are automatically updated by Financial Management application 110. When the user next views the linked electronic financial statement of a set, updated values are displayed. As a result, when the P&L is planned, the system automatically enforces changes on spending plans of the entire organization. Moreover, the user who plans the P&L is not required to exit one planning application and enter another, separate application in order to plan spending targets or spending capacity values based on the P&L.

Electronic Financial Statements

FIG. 4A is a diagram of a balance sheet that may be generated. In one embodiment, balance sheet 400 of FIG. 4A is generated by Financial Management application 110 in response to selection of a Balance Sheet link 404 from among a plurality of function links 402. Balance sheet 400 comprises a plurality of balance sheet lines 406 such as Assets line 406A, Liabilities line 406B, Shareholders' Equity line 406C, etc. Each line 406 is associated with one or more numeric values in accounting period columns 408A, 408B, etc. The accounting period columns correspond, for example, to quarters, months, years, or any other desired accounting period. In this context, a "line" is a text label such as "Assets" in association with all values in columns 408A, 408B. Since details of a line may be accessed by selecting the label as a hyperlink, the terms "line" and "link" herein are sometimes used interchangeably.

Each of the lines 406 is a hyperlink that a user may select to access more detailed supporting information for the associated line. For example, in one embodiment, by selecting the appropriate links on the balance sheet main page, the user can access the following components of the balance sheet: Assets, including Current Assets, Long-Term Assets, and Other Assets; Liabilities, including Current Liabilities, Long-Term Liabilities, and Other Liabilities; and Shareholders' Equity.

FIG. 4B is a diagram of an assets page that may be generated, for example, in response to selecting Assets line 406A.

Figure 4C:
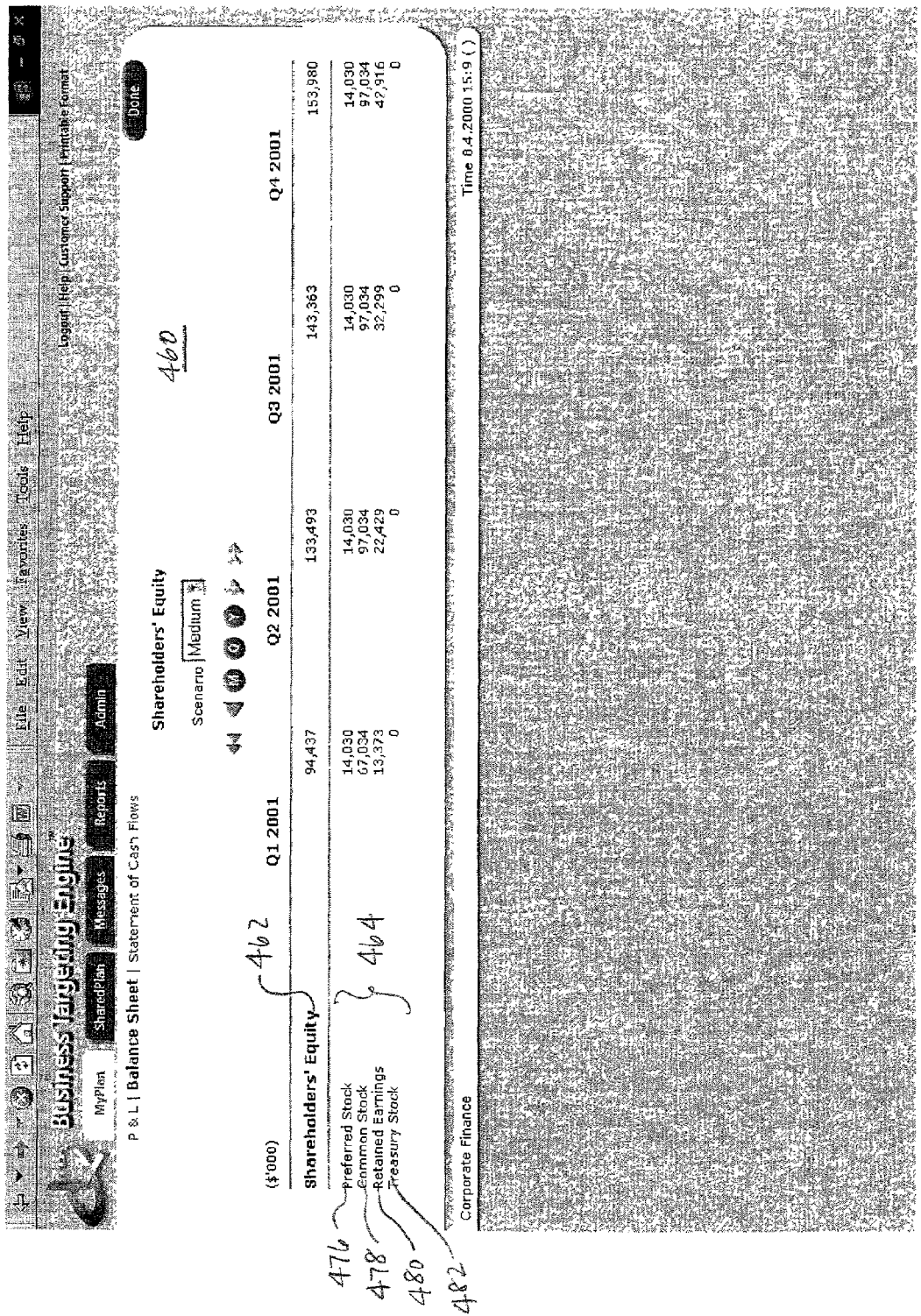
FIG. 4C shows a screen display of a shareholders' equity page that may be generated, for example, in response to selecting the Shareholders' Equity line in the balance sheet statement in one example embodiment.
Figure 4D:
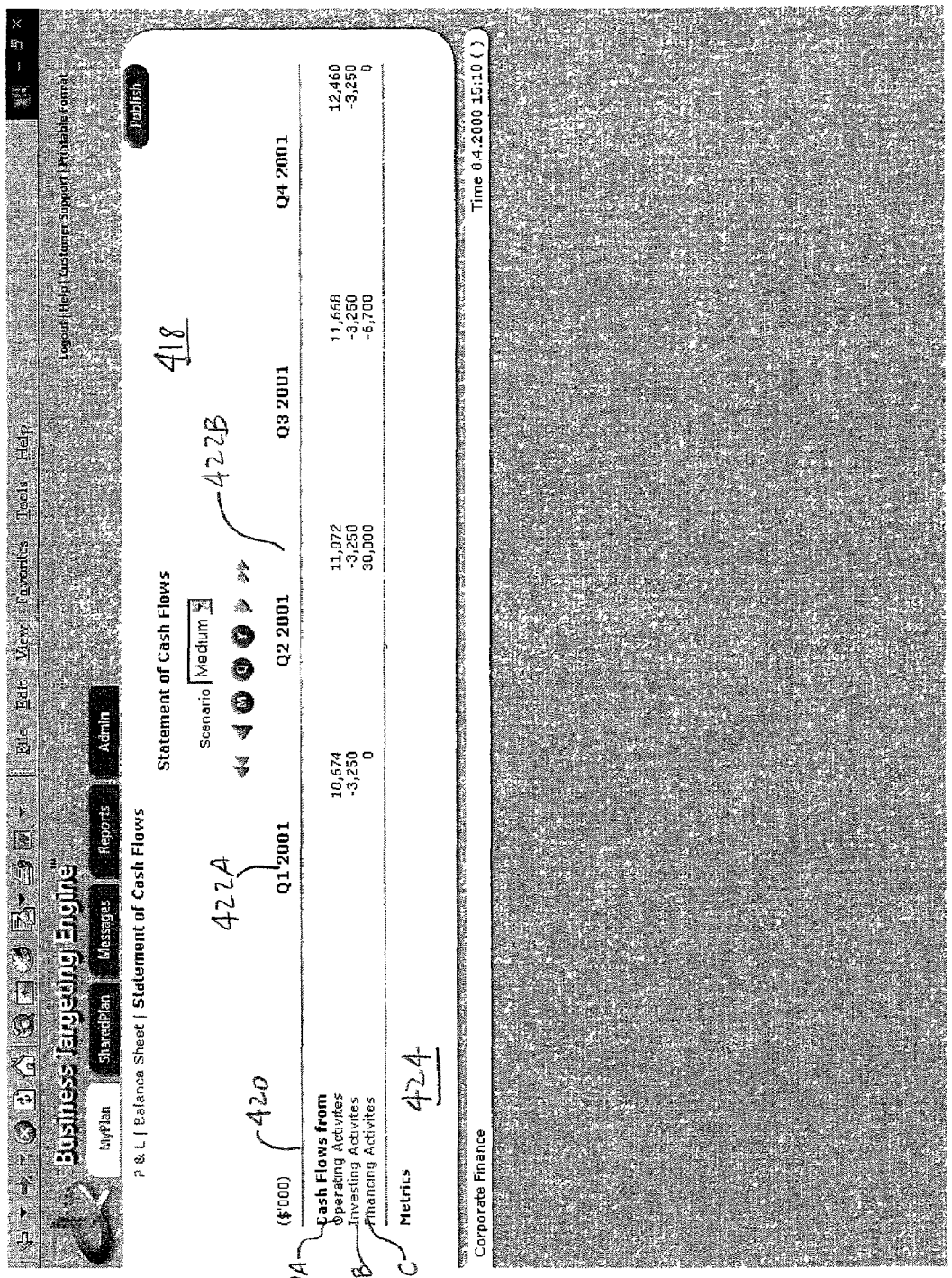
FIG. 4D shows a screen display of a statement of cash flows in one example embodiment.
Figure 4E:
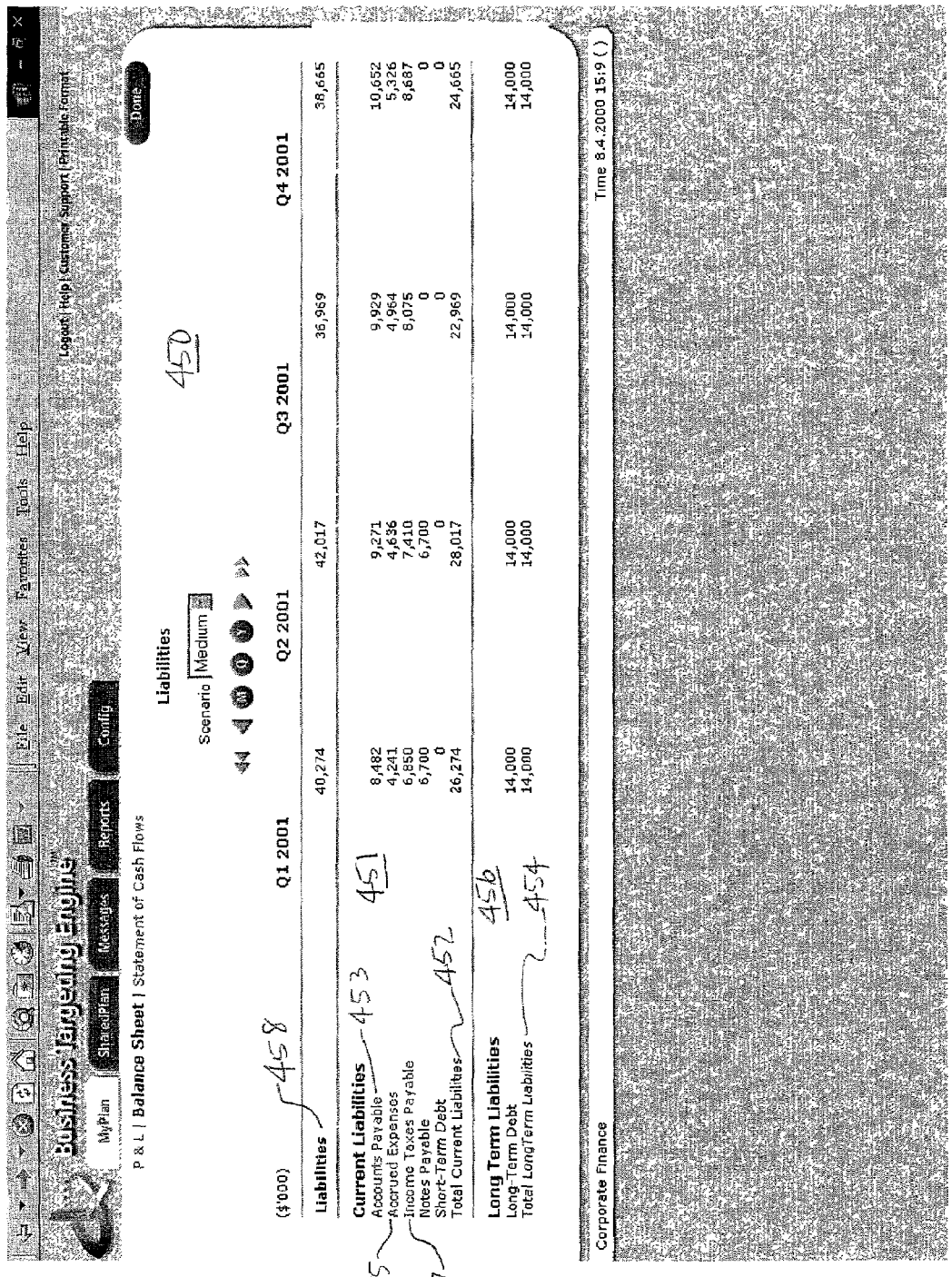
FIG. 4E shows a screen display of a liabilities page that may be generated, for example, in response to selecting the Liabilities line in the balance sheet statement in one example embodiment.

FIG. 4E is a diagram of a liabilities page that may be generated, for example, in response to selecting Liabilities line 406B.

FIG. 4C is a diagram of a shareholders' equity page that may be generated, for example, in response to selecting Shareholders' Equity line 406C.

FIG. 4D is a diagram of a statement of cash flows that may be generated, in one example embodiment. The statement of cash flows is accessed by selecting on a Statement of Cash Flows link 412 of FIG. 4A, FIG. 4B, or FIG. 4C. Statement of cash flows 418 has a plurality of lines 420 that provide hyperlinks for accessing sub-sections of the statement of cash flows, and may also display one or more metrics derived from the statement of cash flow information. By selecting an appropriate line 420 on the statement of cash flows 418, a user can access components of the balance sheet. In one embodiment, selecting line 402A provides a display of Cash Flows from Operating Activities; line 402B provides Cash Flows from Investing Activities; and line 402C provides Cash Flows from Financing Activities.

Figure 5A:
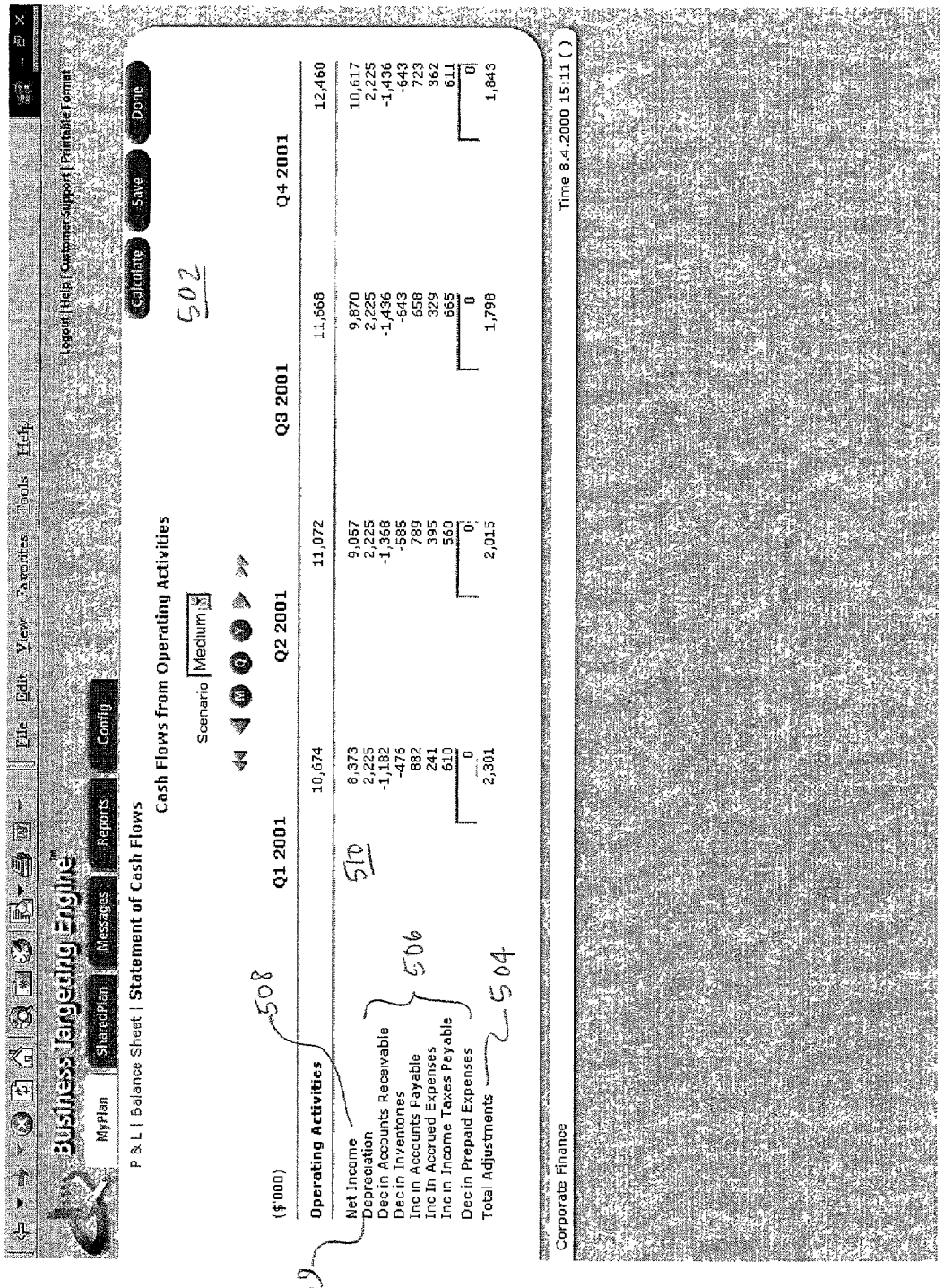
FIG. 5A is a diagram of a cash flow from operating activities page that may be generated, for example, in response to selecting the Operating Activities line in the statement of cash flows.

FIG. 5A is a diagram of a cash flow from operating activities page that may be generated, in one example embodiment.

Figure 5B:
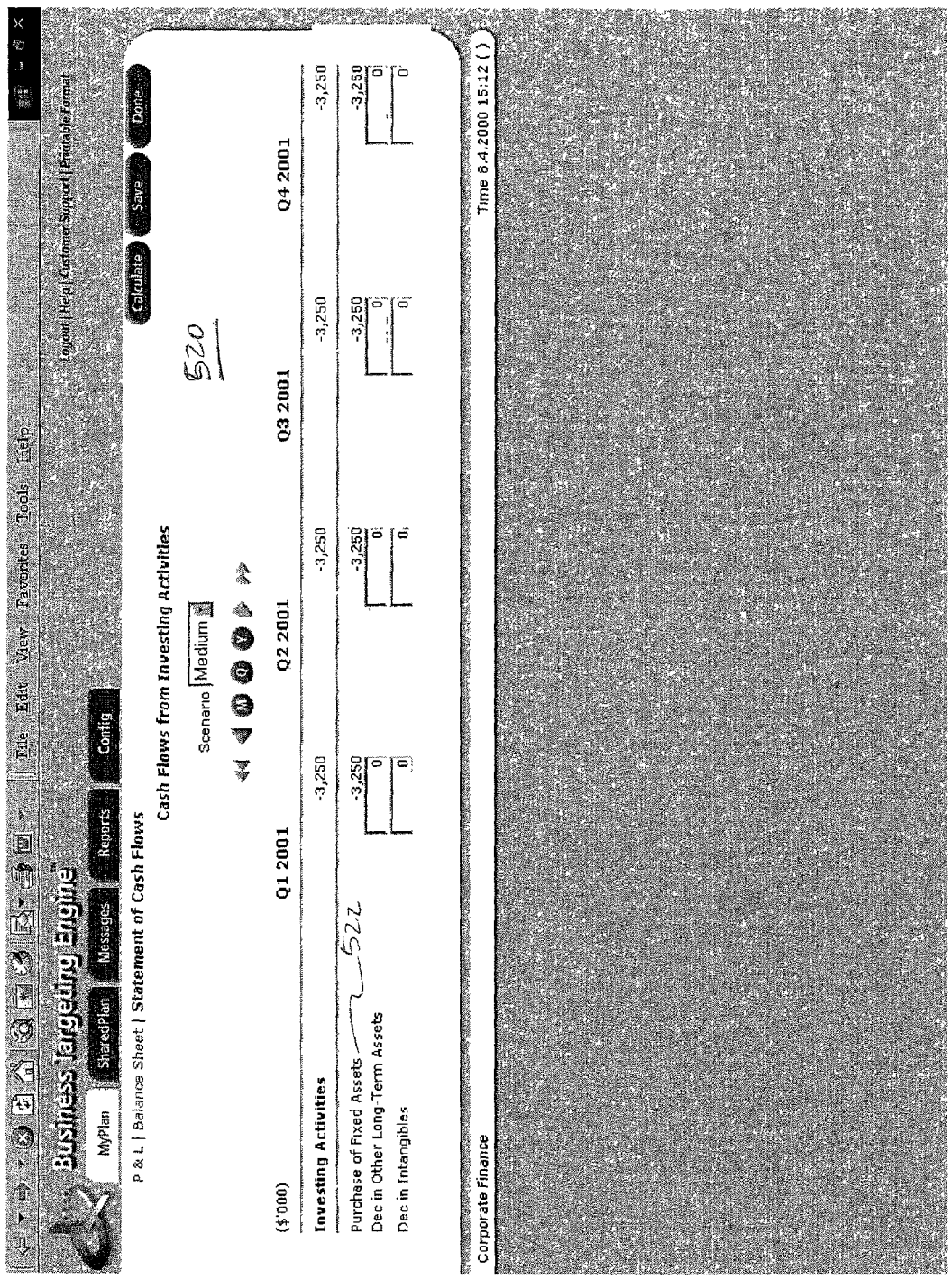
FIG. 5B is a diagram of a cash flows from investing activities page that may be generated, for example, in response to selecting the Investing Activities line in the statement of cash flows.

FIG. 5B is a diagram of a statement of cash flows from investing activities page that may be generated, in one example embodiment.

Figure 5C:
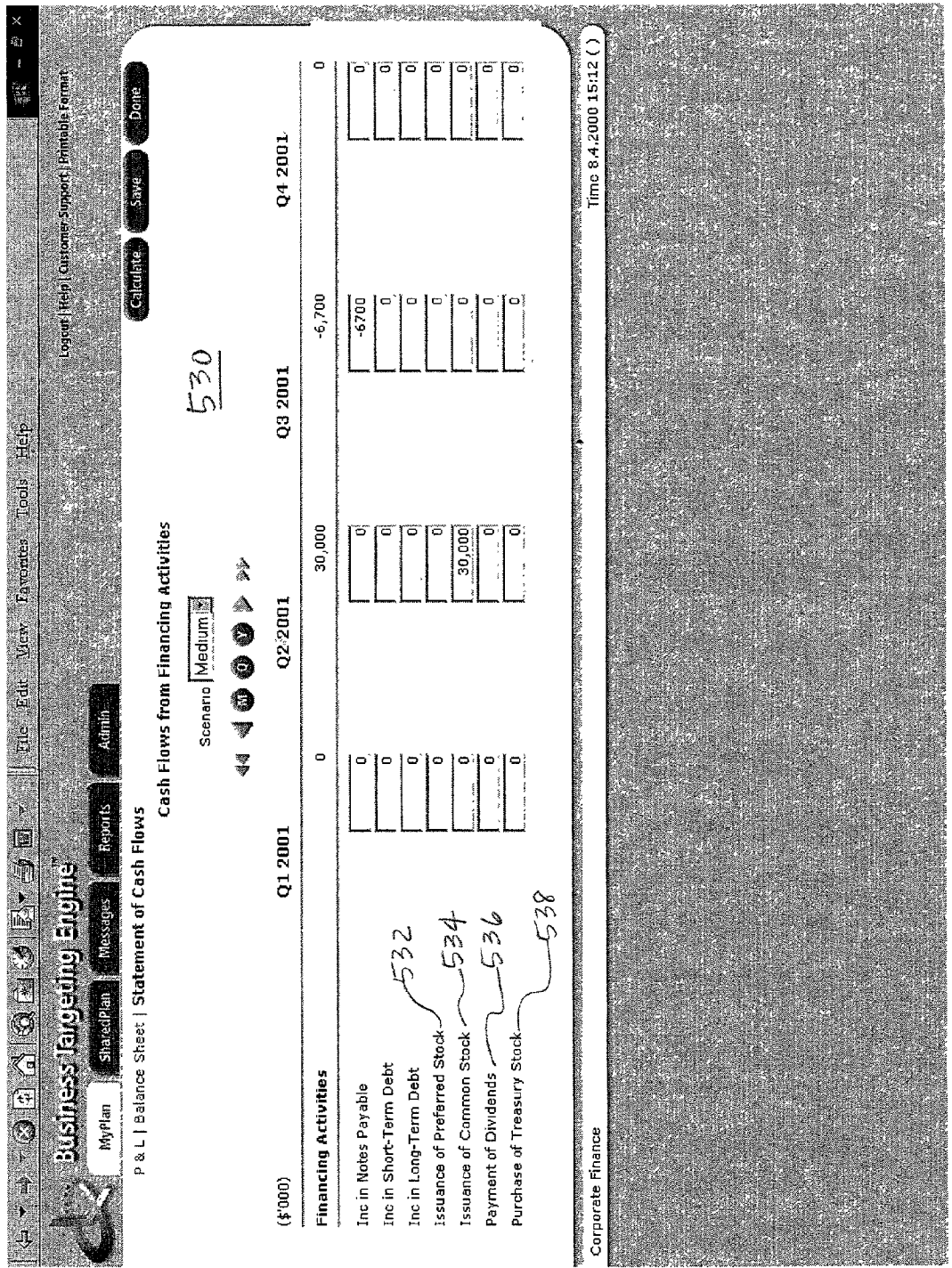
FIG. 5C is a diagram of a cash flows from financing activities page that may be generated, for example, in response to selecting the Financing Activities line in the statement of cash flows.

FIG. 5C is a diagram of a statement of cash flows from financing activities page that may be generated, in one example embodiment.

The Balance Sheet and Statement of Cash Flows are pre-configured with standard accounts and standard accounting relationships. When the Balance Sheet is user-modified to add lines or accounts, the Statement of Cash Flows is automatically updated to ensure accounting consistency. According to one embodiment, such automatic updating is facilitated by four different types of lines in the balance sheet and statement of cash flows, comprising calculated lines, modeled lines, user-defined lines, and standard lines. As described further herein, lines of the balance sheet are logically linked to lines of the statement of cash flows and lines of an associated P&L. Pre-configuration of the electronic documents with such lines, as detailed herein, enables a user to rapidly commence planning activities without having to self-establish relationships among the documents, and also assists the user in maintaining a consistent structure among the interlinked planning documents without manual steps.

Calculated Lines

Calculated lines incorporate standard arithmetic relationships and cannot be renamed or otherwise configured. Each calculated line is calculated based on information that is displayed in a financial statement, such as total values, net values, etc. Calculated lines are not associated with other values that the user can view or "drill down" to.

The balance sheet 400 of FIG. 4A and its components comprise the following calculated lines. A Total Current Assets line 432 of the Current Assets section 431 of Assets page 430 (FIG. 4B) is the sum of all lines 434 in the Current Assets section. A Net Long-Term Assets line 436 of a Long-Term Assets section 440 of Assets page 430 is the sum of all lines 438 in the Long-Term Assets section. The term Net is used for line 436, rather than Total, because the Accumulated Depreciation line comprises negative values. The Total Assets line 442 of Assets page 430 is the sum of the Total Current Assets line 432, Net Long-Term Assets line 436 and all lines in Other Assets section 444.

Referring now to FIG. 4E, the Total Current Liabilities line 452 in Current Liabilities section 451 of Liabilities page 450 is a sum of all lines in Current Liabilities section 451. The Total Long-Term Liabilities line 454 in Long-Term Liabilities section 456 is a sum of all lines in Long-Term Liabilities section 456. The Total Liabilities line 458 is a sum of Total Current Liabilities line 452, Total Long-Term Liabilities 454, and all lines in an Other Liabilities section, if any.

Referring to FIG. 4C, the Total Shareholders' Equity line 462 of Shareholders' Equity page 460 is a sum of all lines 464 in the Shareholders' Equity page.

Referring to FIG. 5A, for the statement of cash flows, the Total Adjustments line 504 is the sum of all lines 506 in the Cash Flows from Operating Activities page 502, except for Net Income line 508. In FIG. 4D, the Net Cash from Operating Activities line 420A is a sum of Total Adjustments line 504 and Net Income line 508 of FIG. 5A. Thus, line 420A is logically linked to line 504 and line 508. Similarly, the Net Cash from Investing Activities line 420B is a sum of all lines in the Cash Flows from Investing Activities page 520, and the Net Cash from Financing Activities line 420C is a sum of all lines in the Cash Flows from Financing Activities page 530.

Modeled Lines

Modeled lines incorporate models that can be used to predict certain values. In this context, each modeled line is associated with a multiplicative model that receives a first input from the Financial Management application 110 and a second input from that is entered by a user. Financial Management application 110 enables a user to override the values that are predicted by models. In one embodiment, models may be used in two ways. In a first approach, a model is "plugged in," and always populates the balance sheet with the calculated value. In a second approach, the model is disconnected from the balance sheet line, thereby only serving as a guide to the user who enters the values.

Figure 6:
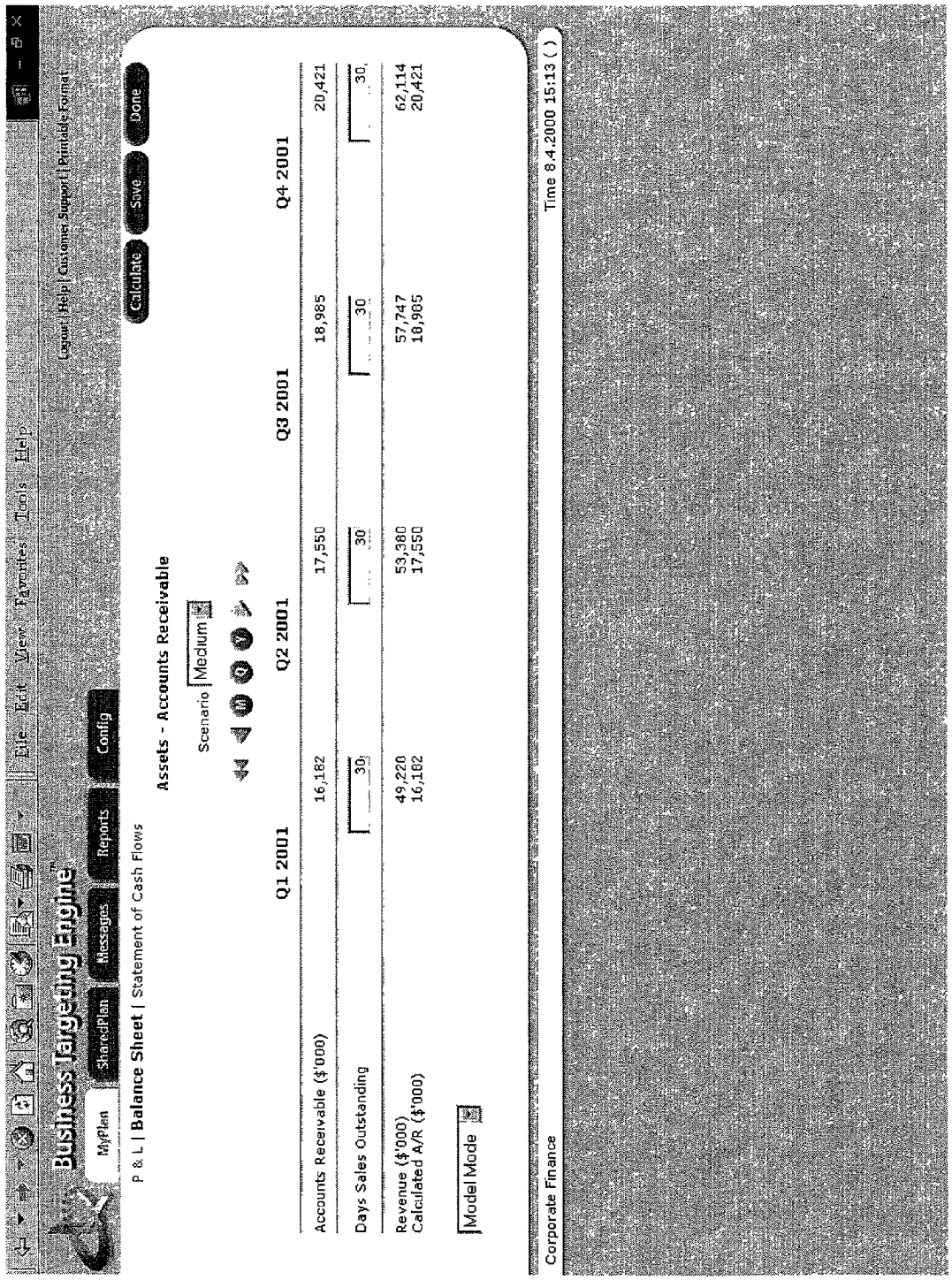
FIG. 6 is a diagram of a model page for an Accounts Receivable model.

FIG. 6 is a diagram of a model page for an Accounts Receivable model that is associated with the Assets page 430. A user can switch between the two modes within using a pull-down menu 602 that is displayed in the screen displays; alternatively a mode may be selected using a configuration screen. Modeled lines allow a one-level drill-down so that the user can access the underlying models and make edits.

Specific modeled lines in the balance sheet and statement of cash flows are now described. In one embodiment, for the balance sheet, modeled lines comprise Accounts Receivable line 435 of Assets page 430 (FIG. 4B), Inventories line 437, Accounts Payable line 453 of Current Liabilities page 450 (FIG. 4E), Accrued Expenses line 455, and Income Taxes Payable line 457. Table 3 summarizes models for such balance sheet lines in one specific embodiment.

TABLE 3

MODELS FOR BALANCE SHEET LINES

| Balance Sheet Line | Model | Variable 1 (User-Supplied) | Variable 2 (From Financial Management application) | Formula |
|---|---|---|---|---|
| Accounts Receivable | Days Sales Outstanding Model | Days Sales Outstanding | Revenue in P&L | =(DSO/Number of days in relevant time period) * Revenue |
| Inventories | Inventory Turns Model | Inventory Turns per Year | COS in P&L | =COS/Inventory Turns (normalized to relevant time period) |
| Accounts Payable | Days Payable Model | Days Payable | Operating Expenses in P&L | =(Days Payable/Number of days in relevant time period) * Op Exp |
| Accrued Expenses | Days Payable Model | Days Payable | Operating Expenses in P&L | =(Days Payable/Number of days in relevant time period) * Op Exp |
| Income Taxes Payable | Percent Income Tax Model | Days Payable | Income Tax in P&L | =(Days Payable/Number of days in relevant time period) * Income Tax |

Model pages similar to the model page of FIG. 6 may be provided for each modeled line. Thus, there may be a model page for the accounts payable line, a model page for the inventories line, a model page for the accrued expenses line, a model page for the income taxes line, etc.

Modeled lines in the balance sheet are logically linked to corresponding lines in the statement of cash flows. In one specific embodiment, such linked lines comprise lines 506 of the cash flows from operating activities page 502 of FIG. 5A, including a Decrease in Accounts Receivable line, Decrease in Inventories line, Increase in Accounts Payable line, Increase in Accrued Expenses line, and Increase in Income Taxes Payable line. Each such line in the statement of cash flows is calculated from a difference in values of the corresponding balance sheet lines over successive periods, either as an increase or as a decrease. An increase or decrease is selected in a manner to ensure that the effect on cash flow of any line is positive if the number in the corresponding line is positive.

User-Defined Lines

User-defined lines are created and stored by a user in a configuration step. There can be any number of user-defined lines in one or more locations in the balance sheet and statement of cash flows. However, for accounting consistency, each user-defined line in the balance sheet must have a corresponding user-defined line in the statement of cash flows.

In one specific embodiments, the following user functions may be carried out with respect to user-defined lines: Adding a new line in the balance sheet (and adding the corresponding line in the statement of cash flows); updating a line in the balance sheet (and updating the corresponding line in the statement of cash flows); deleting a line from the balance sheet (and deleting the corresponding line in the statement of cash flows).

FIG. 7A is a diagram of an Add Line page that may be generated to receive user input for creating a new user-defined line in the balance sheet and associating it with a related line in the statement of cash flows, and for carrying out the converse.

Add Line page 700 of FIG. 7A comprises a plurality of graphical user interface widgets and data entry fields 702, 704, 706, 708. To add a user-defined line to Balance Sheet 400 and associate it with a related line in an associated statement of cash flows, a user enters a name of the line in Name field 706. The user selects a location of the line in the balance sheet using a Location pull-down menu 702. In one embodiment, the location value is selected from one of Current Assets section 431 (FIG. 4B), Long-Term Assets section 440, Other Assets section 444, Current Liabilities section 451 (FIG. 4E), Long-Term Liabilities section 456, or an Other Liabilities section. Examples of user-defined lines and typical corresponding locations include Prepaid Expenses (Current Assets), Notes Payable or Short-Term Debt (Current Liabilities), Long-Term Debt (Long-Term Liabilities), Intangibles (Other Assets), and Goodwill (Other Assets).

The user also selects a location in the statement of cash flows for a corresponding and related line, using pull-down menu 704, and provides a name for the line in data entry field 708. Selecting the Add link 710 stores this information in the database and creates a logical link between the balance sheet and statement of cash flows. In the example of FIG. 7A, a balance sheet line named Prepaid Expenses becomes logically associated with a related line named Decrease in Prepaid Expenses in the statement of cash flows. The Prepaid Expenses line is located one logical level below the Current Assets line of the balance sheet, and the Decrease in Prepaid Expenses line is located one logical level below the Operating line off the statement of cash flows.

Figure 7B:
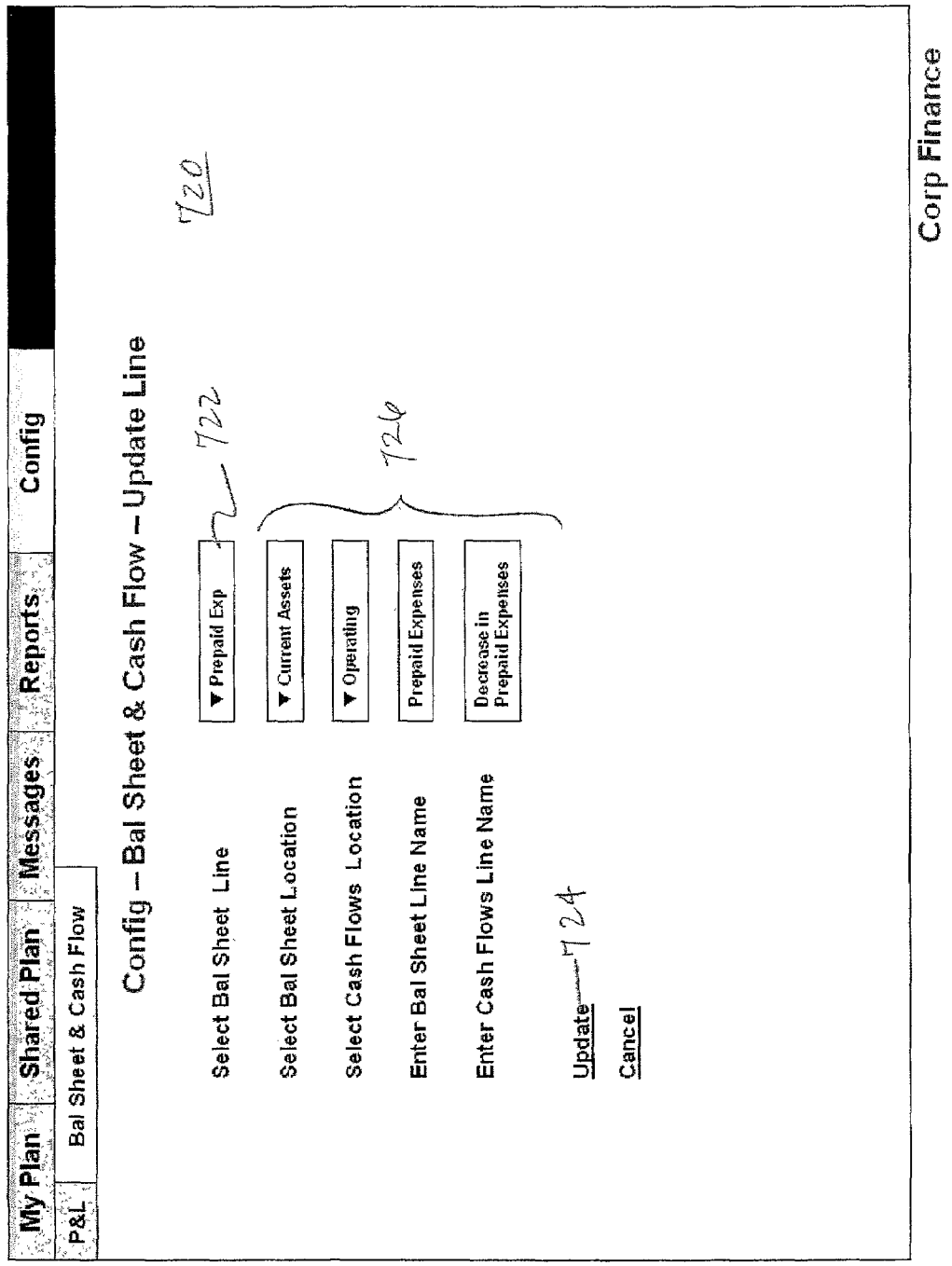
FIG. 7B is a diagram of an Update Line page that may be generated to receive user input for modifying a user-defined line in the balance sheet or statement of cash flows.

FIG. 7B is a diagram of an Update Line page that may be generated to receive user input for modifying a user-defined line in the balance sheet or statement of cash flows, in one example embodiment. An existing line of the balance sheet is selected using pull-down menu 722. Modifying the line and its relationship to other lines in the statement of cash flows involves steps similar to adding a line as described above with respect to FIG. 7A. The pull-down menus and data entry fields of FIG. 7B are updated as desired, and an Update link 724 is selected to create updated logical associations of related lines.

When user-defined lines are added to the Balance Sheet 400 in the foregoing manner, Financial Management application 110 automatically sets up corresponding lines in the Statement of Cash Flows. Financial Management application 110 also prompts the user for the following information, for example, during configuration:

1. Location of the line in the statement of cash flows (e.g., Cash Flows from Operating Activities, Cash Flows from Investing Activities or Cash Flows from Financing Activities);

2. Name of the line (which may be pre-populated with either "Increase in" or "Decrease in" followed by the balance sheet line name). The logic for choosing "Increase in" or "Decrease in" is to ensure that the effect on cash flow of any line is positive if the number in the line is positive. Hence, if the balance sheet line is to be located in Assets, the cash flow line will have a "Decrease in" and if the balance sheet line is to be located in Liabilities, the cash flow line will have an "Increase in". Regardless of the name finally assigned by the user, the application will use the same logic while relating the balance sheet line and the cash flow line (described below).

In one embodiment, user-defined lines do not have modeling capability associated with them. Instead, user input is received for values for the user-defined lines. For each pair of balance sheet and cash flow lines, the user enters cash flow information, and the corresponding balance sheet information is automatically updated accordingly, by following logical links of the balance sheet to the statement of cash flows. For example, consider the Prepaid Expenses line of the Current Assets section of the balance sheet, and the Decrease in Prepaid Assets line in the Cash Flows from Operating Activities component of the statement of cash flows. Assume that a user enters values for Decrease in Prepaid Assets. In response, values for Prepaid Expenses are calculated automatically using a cumulative model. One example of a cumulative model is that Prepaid Expenses for the end of Q2 2000 equal Prepaid Expenses for the end of Q1 2000 less the Decrease in Prepaid Expenses for Q2 2000.

As another example, assume that the user is working with the Increase in Long-Term Debt line in the Cash Flows from Financing Activities component of the statement of cash flows, which corresponds to the Long-Term Debt line in the Long-Term Liabilities portion of the balance sheet. Assume that a user enters values for the Increase in Long-Term Debt line. In response, values for the Long-Term Debt line are calculated using a cumulative model. An example of a cumulative model in this context is that Long-Term Debt for the end of Q2 2000 equals the sum of Long-Term Debt for end of Q1 2000 and Increase in Long-Term Debt for Q2 2000).

In this configuration, the user enters cash flow information rather than balance sheet information. As a result, the user is not required to enter values repeatedly for lines such as Long-Term Debt and Intangibles, which do not change often.

A user may define an "others" line for each section of the balance sheet and statement of cash flows to enable tracking of miscellaneous values without significant re-configuration. For example, the following lines (with locations) could be set up: Others (in balance sheet, Assets section) logically linked to Others (statement of cash flows, Cash Flows from Operating Activities section); Others (balance sheet, Liabilities section) logically linked to Others (statement of cash flows, Cash Flows from Investing Activities section); Others (balance sheet, Shareholders' Equity section) logically linked to Others (statement of cash flows, Cash Flows from Financing Activities section).

Standard lines correspond to lines found in conventional paper accounting forms, and have standard accounting relationships. In one specific embodiment, for the balance sheet, standard lines comprise Cash and Cash Equivalents line 470 of Assets page 430 of FIG. 4B; Fixed Assets line 472; Negative Accumulated Depreciation line 474; Preferred Stock line 476 of Shareholders' Equity page 460 of FIG. 4C; Common Stock line 478; Retained Earnings line 480; and Treasury Stock line 482.

Cash and Cash Equivalents line 470 is a "plug" used to balance the balance sheet; its value is equal to Total Liabilities+Total Shareholders' Equity—Sum of all lines in Current Assets except Cash and Cash Equivalents—Net Long-Term Assets—Sum of all lines in Other Assets. The value for this line is automatically calculated by Financial Management application 110.

Fixed Assets line 472 is the aggregate value of all fixed assets owned by the company. Fixed assets information is read from resource manager plans present in Financial Management application 110. Resource manager plans are described further herein in the sub-section entitled RESOURCE MANAGERS. In one embodiment, for each of the resource manager plans, the fixed assets value for past periods is imported from an external system that is used by the enterprise to manage its fixed assets. For future periods, the fixed assets value is the sum of the existing assets value, which may be imported from the asset management system, and the aggregate value of the planned asset additions.) The value for this line is calculated automatically by Financial Management application 110.

Negative Accumulated Depreciation line 474 is the negative of the aggregate value of the accumulated depreciation on all fixed assets owned by the company. Depreciation information is read from the resource manager plans. For such resource manager plans, the accumulated depreciation value for past periods is imported from the asset management system. For future periods, the accumulated depreciation value is the sum of the accumulated depreciation value on existing assets, imported from the aforementioned asset management system, and the value of the accumulated depreciation on the planned asset additions. The value for this line is calculated automatically by the application 110.

Preferred Stock line 476 is the cumulative net cash inflow from the issuance of preferred stock. The Preferred Stock value at the end of any period is the value at the end of the existing period plus the Proceeds from Issuance of Preferred Stock (in the statement of cash flows) for that period. In one embodiment, the user inputs the values for Proceeds from Issuance of Preferred Stock and the application 110 automatically calculates the cumulative Preferred Stock value.

Common Stock line 478 is the cumulative net cash inflow from the issuance of common stock. The Common Stock value at the end of any period is the value at the end of the existing period plus the Proceeds from Issuance of Common Stock (in the statement of cash flows) for that period. The user inputs the values for Proceeds from Issuance of Common Stock and the system calculates the cumulative Common Stock value.

Retained Earnings line 480 is the cumulative sum of Net Income for a company, increased by the cumulative sum of Proceeds from Payments of Dividends. Retained Earnings at the end of any period equal Retained Earnings at the end of the previous period plus Net Income for the period plus Proceeds from Payments of Dividends for that period. The value for this line is automatically calculated by application 110. Treasury Stock line 482 is the negative of the cumulative sum of Proceeds from Purchase of Treasury Stock, and is calculated automatically by the application 110.

Statement of Cash Flows standard lines comprise Net Income line 508 (FIG. 5A), Depreciation line 509, Proceeds from Purchase of Fixed Assets line 522 (FIG. 5B), Proceeds from Issuance of Preferred Stock line 532 (FIG. 5C), Proceeds from Issuance of Common Stock line 534, and Proceeds from Payments of Dividends line 536.

Net Income line 508 is obtained from the Net Income value for the corresponding period in the P&L. The value for this line is automatically retrieved from the P&L and entered in the Statement of Cash Flows by application 110 by following the logical links. Depreciation values for Depreciation line 509 for any period are the negative of the difference in the Negative Accumulated Depreciation at the end of that period and the corresponding value at the end of the previous period. The dual negatives result because a positive depreciation number makes a positive adjustment to cash flow. The value for this line is automatically calculated by the application 110.

Proceeds from Purchase of Fixed Assets line 522 for any period is the negative of the aggregate dollar value of purchased assets for the entire company for that same period (taken from all resource managers' plans). The negative sign results because a purchase of an asset leads to a negative cash inflow. The value for this line is supplied automatically by application 110.

Proceeds from Issuance of Preferred Stock line 532 is the market value, at the time of issuance, of any preferred stock issued by the company in a particular period. This information is received from user input. Proceeds from Issuance of Common Stock line 534 is the market value, at the time of issuance, of any common stock issued by the company in a particular period, and is entered by the user. Proceeds from Payments of Dividends line 536 is entered by the user. In one embodiment, a system message reminds the user that a positive payment of dividends implies a negative cash flow and hence the entered number should be negative of the value of dividends paid out in any period. Values for the Proceeds from Purchase of Treasury Stock line 538 are entered directly by the user.

Resource Managers

In an embodiment, Spending Capacity Module 152 of Financial Management application 110 comprises one or more resource managers that are associated with top-level departments of an enterprise. For example, a Marketing resource manager is used to manage spending capacity values for a Marketing department of the enterprise. A user may interact with the resource managers from a P&L in the private planning area or shared planning area. For example, in the private planning area, selecting a line in a P&L that is associated with a resource manager, such as a Marketing expense line, causes Financial Management application to redirect the user to the corresponding resource manager. Moreover, modifying a data value in a line of the P&L that is associated with a resource manager automatically causes Financial Management application 110 to update linked values in the associated resource manager.

For example, a user may assign spending capacity values to top-level departments in both the non-variable cost of sales line of the P&L and in the operating expense lines of the P&L. The user may view and manipulate the roll-up or aggregation of planned spending for each top-level department. The user may issue qualitative guidance about spending to the top-level departments. The user may review requests for additional spending capacity from top-level departments, and may approve, partially approve, or reject such requests.

Figure 9:
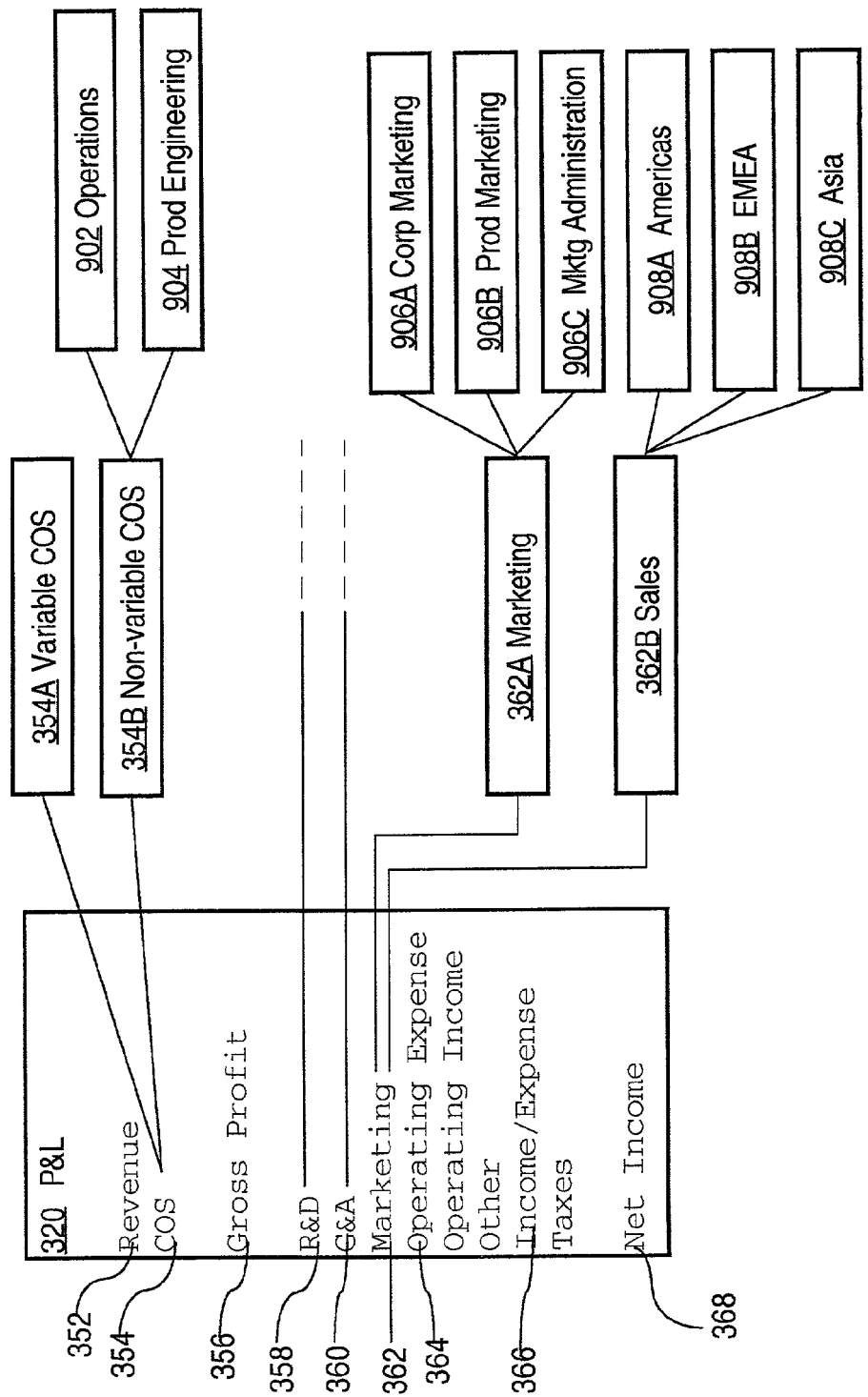
FIG. 9 is a diagram of a mapping of lines of a P&L to top-level departments that may be created and stored, in one example embodiment.

FIG. 9 is a diagram of a mapping of lines of a P&L to top-level departments that may be created and stored, in one embodiment. In this example, lines 352-368 of P&L 320 (FIG. 3E) map to corresponding departments 902-908 as defined in a department hierarchy. The department hierarchy of FIG. 3A may be used, or any other department hierarchy as described above in the section entitled "Hierarchical Planning Environment."

Each of the lines 352-368 may have one or more subordinate lines at lower hierarchical levels. For example, cost of sales ("COS") line 354 is associated with a Variable COS line 354A and Non-variable COS line 354B. In an embodiment, selecting COS line 354 from a summary view of P&L 320 causes Financial Management application 110 to re-display the P&L 320 with the subordinate lines displayed in association with the next higher hierarchical level. Each of the subordinate lines may be associated with one or more departments. In the example of FIG. 9, Non-variable COS line 354B is associated with Operations department 902 and Production Engineering department 904.

The mapping of FIG. 9 is stored in database 112 and supports navigation by a user from the P&L to a resource manager associated with a department. For example, assume that a user selects Marketing line 362 from P&L 320; in response, Financial Management application 110 generates a view of P&L 320 that includes Marketing line 362A and Sales line 362B. The user then selects Marketing line 362A and receives a display that includes Corporate Marketing department 906A, Product Marketing department 906B, and Marketing Administration department 906C displayed hierarchically in association with Marketing line 362A. The user selects Corporate Marketing department 906A. In response, Financial Management application 110 redirects the user to a spending capacity resource manager that is associated with the Corporate Marketing department and passes control to Spending Capacity module 152. The user may modify one or more spending capacity values for the Corporate Marketing department. When the user returns to the P&L, the Marketing line 362 and all subordinate lines are automatically updated to reflect any changes made using the spending capacity resource manager.

Conversely, the P&L, balance sheet and statement of cash flows also may be affected by changes in department spending capacities and plan. In one embodiment, the Total Operating Expenses line is updated based on changes in department spending capacities, and ultimately affects the P&L as input to the model of Accrued Expenses in the balance sheet. Also, changes in purchases of fixed assets may be planned by department managers and are automatically updated to the lines of the balance sheet that relate to fixed assets, e.g., Fixed Assets and Negative Accumulated Depreciation, and lines of the statement of cash flows that relate to fixed assets, e.g., Proceeds from the Purchase of Fixed Assets, Depreciation.

In this way, a data representation of a department hierarchy is linked to the P&L and enables a user to directly access spending capacity management functions associated with departments from the P&L. As a result, a user can modify spending capacity values at the department level in a manner that is closely integrated to a view of overall business performance, as provided by the P&L.

In addition, a plurality of links is provided from departmental spending plans to a statement of cash flows at the Corporate level. For example, capital purchases carried out by departments are not shown in any line of the Corporate P&L, but are appropriate to roll up into the Corporate statement of cash flows. Accordingly, in one embodiment, Financial Management application 110 follows links for department P&Ls to Corporate and roll-up department statements of cash flows, and automatically computes updates to such statements of cash flows when changes are made to the department P&Ls.

Spreading Methodologies

When values are entered in P&L 320 at the quarterly or yearly level, the values are spread into the individual months according to a specified spreading methodology. An administrator may select a spreading methodology from among a plurality of available spreading methodologies in a configuration step. Each spreading methodology provides processes for dividing funds entered for longer time periods, such as by year, into amounts for use with a shorter time period, such as by month or quarter, and for the converse.

For example, assume that a company's CEO assigns one rollup department an annual spending capacity of $20 million. Spending Capacity module 152 uses this annual amount to calculate quarterly and monthly spending capacity values for that rollup department, so that the department manager can set spending capacity values for the cost centers that report to the rollup department.

In one embodiment, methods for spreading numbers entered at the annual or quarter levels into the underlying months comprise proportional spreading, even spreading, 4-4-5 spreading, 5-4-4 spreading, and 4-5-4 spreading. Each company that uses Financial Management application 110 has a primary and a secondary spreading methodology. The primary spreading methodology is used unless it is inapplicable, in which case the secondary spreading methodology is used.

Proportional spreading distributes the number entered at the annual or quarterly level into the underlying months according to the proportion of the numbers already in those months. For example, consider a quarter with a combined number of 6, with months that show 1, 2, and 3 respectively. If a user changes the quarterly number to 12, proportional spreading will distribute this change to the months as 2, 4 and 6.

In one embodiment, proportional spreading is either enabled or disabled for the company. Thus, proportional spreading is either the primary spreading methodology or is not used at all; it cannot be the secondary spreading methodology. If proportional spreading is disabled, or if a user enters new information in a previously blank field, then the system uses the secondary spreading methodology.

In even spreading, the number entered at the annual or quarterly level is distributed evenly into the underlying months. For example, if a user enters 12 into an annual field, even spreading will distribute 1 into each month.

In 4-4-5, 5-4-4, and 4-5-4 spreading, patterns are used for distributing quarterly numbers into underlying months according to an assumed number of weeks in each month. 4-4-5 assumes that there are 4 weeks in the first and second months, and 5 weeks in the third month. 5-4-4 assumes that there are 5 weeks in the first month, and 4 in the second and third months. 4-5-4 assumes there are 4 weeks in the first and third months, and 5 weeks in the second month. For example, using 4-4-5 spreading, a value of "26" entered at the quarterly level is distributed to the underlying months as "8," "8" and "10." Using 5-4-4 spreading, it is distributed as 10, 8, and 8. Using 4-5-4 spreading, it is distributed as 8, 10, and 8.

Rates that are entered at the quarterly or annual level are spread into the underlying months by copying. Since rates are a percentage of another number, such as a salary, rather than a freestanding amount, they do not need to be spread into underlying months. They are simply copied into the underlying months directly. For example, a five percent salary adjustment can be applied to an annual salary of $120,000 at the annual, quarterly, or monthly level and the result is exactly the same. At the annual level, a five percent salary adjustment means a raise of $6,000, bringing the total annual salary to $126,000. At the quarterly level, the same five percent salary adjustment means a raise of $1,500, bringing the total quarterly salary to $31,500. Multiplying by four to calculate the annual salary yields $126,000. At the monthly level, the same five percent salary adjustment means a raise of $500, bringing the total monthly salary to $10,500; when multiplied by twelve to calculate the annual salary, the result is the same ($126,000.)

Metrics for the P&L, Balance Sheet and Statement of Cash Flows

Referring again to FIG. 4A, Financial Management application 110 generates and displays one or more metrics values in metrics lines 410. A user may select specific metrics to display by selecting Metrics link 411. In one embodiment, in response to selecting Metrics link 411, application 110 generates and displays a list of metrics for selection; upon selection of a metric, an associated value is automatically computed, and balance sheet 400 is re-generated and displayed with the metric value in metrics lines 410.

For purposes of illustrating an example, this description focuses on metrics of balance sheet 400 of FIG. 4A. However, metrics can be derived and displayed similarly for a P&L or statement of cash flows.

In one specific embodiment, one or more of the following metrics lines can be selected: Net Working Capital=Total Current Assets−Total Current Liabilities; Current Ratio=Total Current Assets/Total Current Liabilities; Quick Assets=Cash & Cash Equivalents+Accounts Receivable; Net Quick Assets=Quick Assets−Current Liabilities; Quick Assets Ratio=Quick Assets/Current Liabilities; Debt-to-Equity Ratio=Total Liabilities/Total Shareholders' Equity; Days Sales Outstanding=Accounts Receivable/Revenue, normalized to Revenue per day; Annual Inventory Turns=Inventory/Cost of Sales, normalized to cost of sales per year; Return on Assets=Net Income/Total Assets; Return on Equity=Net Income/Total Shareholders' Equity.

Other metrics may be provided in other embodiments. For example, separate end-of-period and average metrics may be provided. If Prepaid Expenses is added as a user-defined line, the Quick Assets metric may be expressed as Current Assets—Inventories—Prepaid Expenses. Metrics appropriate to the Statement of Cash Flows may be provided.

Time Period Control

According to an embodiment, time period controls are provided that enable Financial Management application 110 to accurately display information for electronic financial statements for particular time periods. In one specific embodiment, each electronic financial statement may be viewed based on month, quarter, or year data, a process referred to herein as "vertical time scrolling." Rules define how electronic financial statements describe data in vertical time scrolling. Different financial statements may follow different rules. For example, the balance sheet is fundamentally different from the P&L, statement of cash flows, and department plans for resource managers because the balance sheet information describes a company at a particular instance in time rather than describing the company over a period of time. Embodiments may also provide horizontal time scrolling, which is the ability to select different time horizons to view and edit in the planning environment.

In one embodiment, the appearance of electronic financial plan data is determined in part by definitions of quantities, drivers and rates. With regard to data quantities, values at higher levels (e.g. a calendar quarter) are aggregates of values at lower levels (e.g., month). If a value is editable at a higher level (e.g. quarter), the values that flow down to the lower levels (e.g. month) are generated by disaggregating the higher level value while keeping the same proportionality as in the original set of values. Drivers are the same as quantities, except that they occur in the context of a rate-driver model. Rates are always associated with a driver and an underlying rate-driver model.

In one embodiment, rates entered at the monthly level are automatically calculated at the quarterly or annual level. When the user enters rates at the monthly level in a private plan and then switches the display to the quarterly or annual level, the system averages the rates you entered and displays the average. In one specific embodiment, values at higher levels (e.g. quarter) are the weighted averages of values at lower levels (e.g. months). E.g., rate (quarter) is such that rate (quarter)*driver (quarter)=sum of (rate (month)*driver (month)) for all months in the quarter. If rates are editable at a higher level (e.g. quarter), the values that blow down to the lower levels (e.g. month) are simply the higher level value repeated for all lower level periods.

In the P&L, in a Price-Volume (or Cumulative Volume) Model for Revenue and Unit Cost-Volume (or Cumulative Volume) Model for COS, price and unit cost are rates while volume (or cumulative) is a driver. Revenue and COS are non-editable quantities. The Non-Variable COS Department spending capacity values, P&L Operating Expense lines and Operating Expense Department spending capacity values are all quantities. The Other Income/Expenses line is a quantity. The tax line itself is a quantity; for the underlying tax model, tax rate is a rate and the income before tax is a non-editable quantity. All calculated lines are quantities.

Because the balance sheet describes the company at a particular instant of time as opposed to the describing the company over a period of time, the rules governing the information displayed at different levels of vertical time scrolling are different. Fundamentally, balance sheet values at any level of time granularity represent end-of-period values as opposed to over-the-period values; hence the values for a higher level (e.g. quarter) correspond to the values for the last period at the lower level (e.g. the third month for the quarter). This leads to certain differences in the definition of quantities, drivers and rates for balance sheet information.

For example, balance sheet quantities are defined as follows: Values for a higher level (e.g. quarter) are the same as the values for the last period at the lower level (e.g. month). If values are editable at a higher level (e.g. quarter), the values that flow down to the lower level (e.g. month) are the same as the higher level value, repeated for each period. All lines (calculated, standard, user-defined, modeled) in the balance sheet are balance sheet quantities, with different levels of editability.

In the Statement of Cash Flows, all lines (calculated, standard, user-defined, modeled) in the statement of cash flows are quantities, with different levels of editability.

All metrics are fractions with a numerator and a denominator. The logic for defining metrics information at different levels of vertical time scroll is as follows. First, metrics are always calculated at the level of time granularity that they are displayed. Second, metrics calculations always follow the formulae specified earlier. The inputs to the calculation (the numerator and the denominator) follow their respective rules for display at different levels of vertical time scroll. For example, consider Return on Assets=Net Income/Total Assets. The numerator is a P&L quantity, while the denominator is a balance sheet quantity. Hence the information used to calculate Return on Assets at the quarterly level will be:

Return on Assets(quarter level)=Net Income(sum of all values for the corresponding months)/Total Assets(value for the $3^{rd}$ corresponding month)

Target Setting for Balance Sheet and Statement of Cash Flows

In one embodiment, a user may create and stored one or more target values for lines of the balance sheet and statement of cash flows in a manner similar to setting target values in a P&L.

(4) Multiple Pro-Forma Plans

In one embodiment, a financial planner can create and modify multiple pro-form a scenarios. In this context, a scenario is a tag or label that is associated with an integrated set of financial statements, and that reflects some internal business or market assumptions. Each scenario is created and saved as a private plan in a private planning area. The planner may then select one or more of the scenarios that is considered most likely, and communicate it to others in the organization by publishing the scenario. Alternatively, users can plan multiple scenarios in their private environments using a structured tagging system that is used throughout the organization, and publish all such scenarios.

Figure 8A:
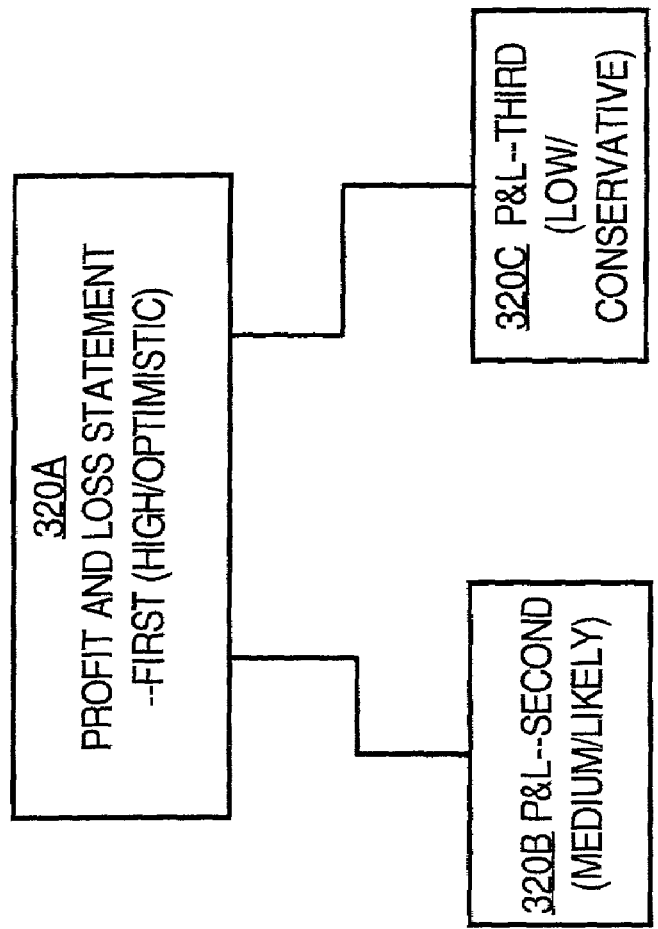
FIG. 8A is a block diagram illustrating a plurality of associated P&Ls.

FIG. 8A is a block diagram illustrating a plurality of associated P&Ls. Each P&L represents an alternative scenario. In one embodiment, Financial Management application 110 enables a user to create and store three associated P&Ls 320A, 320B, and 320C in each instance where a P&L is created or managed. The three associated P&Ls 320A, 320B, 320C generally represent a high financial performance scenario, medium scenario, and low scenario. Alternatively, the P&Ls may be designated as "optimistic," "likely," and "conservative." Any other number of associated P&Ls may be used with any other labels that are useful or meaningful to the user or an associated enterprise. In one embodiment, the labels of the scenarios may be modified or updated by the user in a configuration page.

Multiple scenarios may be created and stored, and then displayed, in association with both the private planning area and shared planning area.

In one specific embodiment, a particular P&L 320A, 320B, 320C may be selected using a graphical user interface element. Referring now to FIG. 4A, a Scenario pull-down menu 413 is provided with menu selections corresponding to the names of scenarios. A user may select a particular P&L 320A, 320B, 320C by selecting its name from pull-down menu 413. In response, Financial Management application 110 retrieves the corresponding P&L from its database. All values of calculated lines are then currently re-calculated; in addition, common-sizing values, such as % Revenue columns in the P&L, are re-calculated. Financial Management application 110 then generates a P&L data for display by the client in the form seen in FIG. 4A and that corresponds to the selected scenario.

Alternative scenarios may incorporate a set of linked financial statements. FIG. 8B is a block diagram illustrating a plurality of alternative sets of linked financial statements and methods of using them. In a first method of use, shown by part (1) of FIG. 8B, a user creates a plurality of scenarios 806A, 806B, 806C, etc., in the private plan environment 802. Each of the scenarios 806A, 806B, 806C represents a different view of prospective financial performance. Each scenario comprises an association of a plurality of financial statements such as a P&L, balance sheet ("BS" in FIG. 8B), and statement of cash flows ("SCF"). As indicated by step 810, a user may select one of the scenarios and publish it from the private plan environment 802 to the public plan environment 804. In this way, a user can evaluate various scenarios and then exposes only one selected scenario to others in the enterprise.

Alternatively, as shown by part (2) of FIG. 8B, the scenarios may be planned and published across the enterprise. In this approach, users plan multiple scenarios in their private environments, using a structured tagging system. In this context, a structured tagging system means that all users in the enterprise use the same label for their copy or version of a scenario that reflects the same assumptions. The users then publish all scenarios. In this arrangement, users may create views of various possible financial performance scenarios and distribute them to others in the enterprise for comment or updating, or to require others in the enterprise to be prepared to conform their planning to multiple different scenarios. Through the use of a consistent naming or labeling mechanism, the assumptions underlying scenarios prepared by different users are implicitly communicated to a group of other users when the scenarios are published.

In an embodiment, certain lines in the P&L, balance sheet and statement of cash flows are allowed to vary from scenario to scenario, and other lines are controlled and do not vary, all under control of Financial Management application 110. For example, those lines that are directly related to short-term revenue and market performance are allowed to vary among different scenarios.

In one specific embodiment, in the P&L the following lines are allowed to vary among scenarios: Revenue; Cost of Sales (variable portion); Other Income/Expenses; and Tax. The following lines are constant across scenarios of P&Ls: Cost of Sales (non-variable portion); and P&L Operating Expenses lines.

Also in a specific embodiment, in the balance sheet, the following lines are allowed to vary among scenarios: in the Assets section, the Cash & Cash Equivalents line, Accounts Receivable line, and Inventories line; in the Liabilities section, the Income Taxes Payable line; in the Shareholders' Equity section, the Retained Earnings line.

The lines that are constant across scenarios include, in one embodiment: in the Assets section, all User-Defined Assets, all Long Term Assets, and all Other Assets; in the Liabilities section, Accounts Payable, Accrued Expenses, all User-Defined Liabilities, and all Long Term Liabilities; and in the Shareholders' Equity section, Preferred Stock, Common Stock, and Treasury Stock.

Also in a specific embodiment, for the statement of cash flows, lines that may vary among scenarios comprise, in the Cash Flows from Operating Activities page, the Net Income line, Decrease in Accounts Receivable, Decrease in Inventories, and Increase in Income Taxes Payable. Lines that are constant across scenarios include all lines in the Cash Flows from Investing Activities page, all lines in the Cash Flows from Financing Activities page. In the Cash Flows from Operating Accounts page, constant lines comprise the Depreciation line, Increase in Accounts Payable, Increase in Accrued Expenses, and all User-Defined lines.

In this configuration, a user may incorporate information about different possible market outcomes into the planning process.

(5) Overview of Systems Supporting an Implementation

Figure 13:
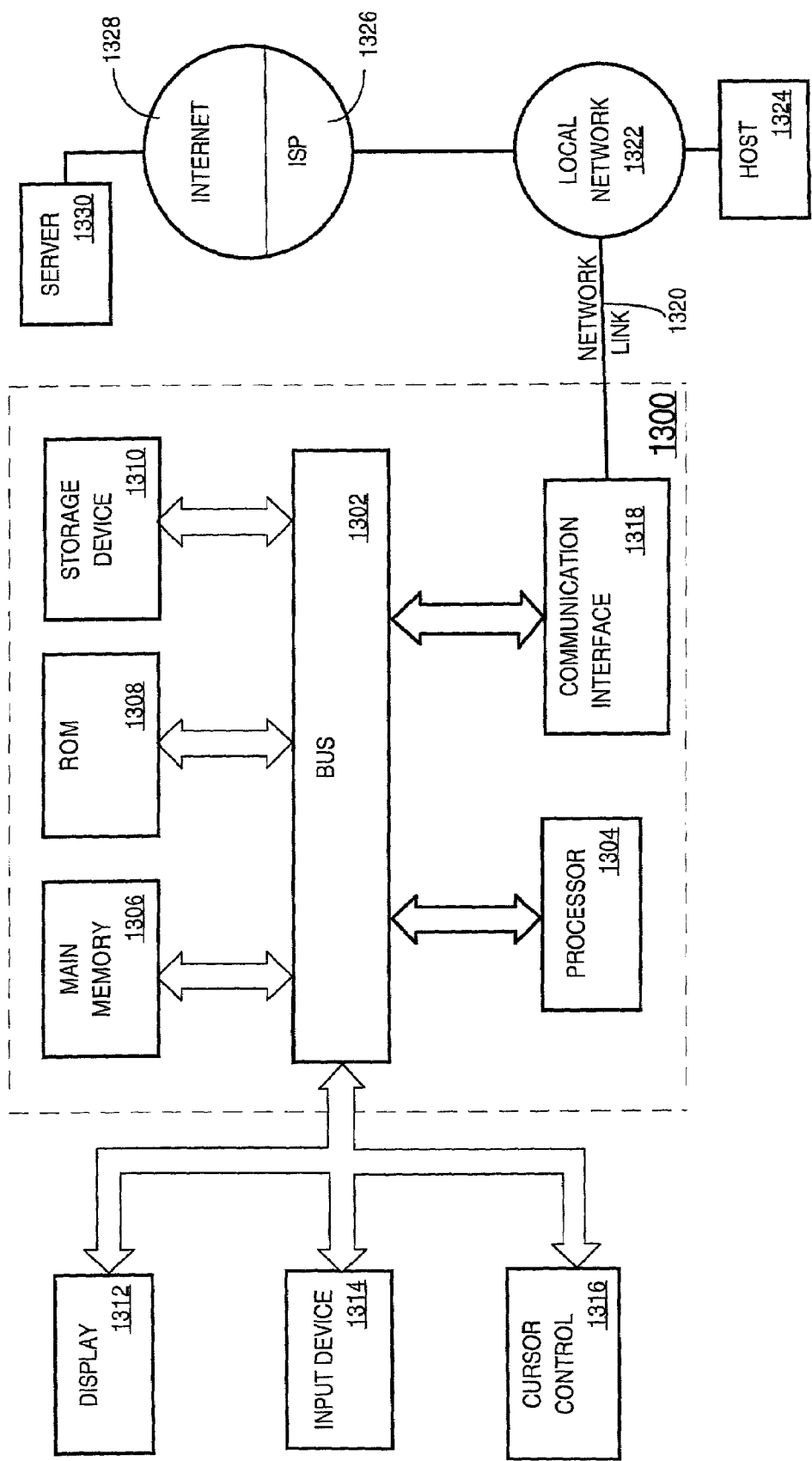
FIG. 13 is a block diagram that illustrates a computer system upon which an embodiment may be implemented.

FIG. 13 is a block diagram that illustrates a computer system 1300 upon which an embodiment of the invention may be implemented. Computer system 1300 represents a computer that may be used to implement client 102 or a server that hosts Financial Management application 110. Computer system 1300 includes a bus 1302 or other communication mechanism for communicating information, and a processor 1304 coupled with bus 1302 for processing information. Computer system 1300 also includes a main memory 1306, such as a random access memory ("RAM") or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory ("ROM") 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube ("CRT"), for displaying information to a computer user. An input device 1314, including alphanumeric and other keys, is coupled to bus 1302 for communicating information and command selections to processor 1304. Another type of user input device is cursor control 1316, such as a mouse, trackball, stylus, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

The invention is related to the use of computer system 1300 for providing automated control of spending plans. According to one embodiment of the invention, providing automated control of spending plans is provided by computer system 1300 in response to processor 1304 executing one or more sequences of one or more instructions contained in main memory 1306. Such instructions may be read into main memory 1306 from another computer-readable medium, such as storage device 1310. Execution of the sequences of instructions contained in main memory 1306 causes processor 1304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1304 for execution. Such a medium may take many forms, including but not limited to, non-volatile media, volatile media, and transmission media. Non-volatile media includes, for example, optical or magnetic disks, such as storage device 1310. Volatile media includes dynamic memory, such as main memory 1306. Transmission media includes coaxial cables, copper wire and fiber optics, including the wires that comprise bus 1302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infrared transmitter to convert the data to an infrared signal. An infrared detector can receive the data carried in the infrared signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network ("ISDN") card or a modem to provide a data communication connection to a corresponding type of telephone line. As another example, communication interface 1318 may be a local area network ("LAN") card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider ("ISP") 1326. ISP 1326 in turn provides data communication services through the worldwide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are exemplary forms of carrier waves transporting the information.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318. In accordance with the invention, one such downloaded application provides for providing automated control of spending plans as described herein.

The received code may be executed by processor 1304 as it is received, and/or stored in storage device 1310, or other non-volatile storage for later execution. In this manner, computer system 1300 may obtain application code in the form of a carrier wave.

FIG. 14 is a block diagram of an example deployment architecture that may be used to implement the embodiments described herein.

In the example of FIG. 14, Financial Management application 110 is implemented as a Web-based application. An application user logs into the application 110 from a client 102A using a Web browser 105, such as Microsoft Internet Explorer. The application 110 resides as a servlet in an application server 1402, such as Apache Tomcat, and is written in the Java programming language. The application server 1402 is accessed from a Web server such as the Apache web server, also represented by block 1402. The application logic interprets a user request to view data, or update data, or import or export a file. A user request and the application's response are carried over the HTTP (or HTTPS) Internet protocol. Typically, the application logic involves accessing local memory, local files, or the application database, choosing an algorithm appropriate to the request, and returning a dynamically generated HTML page back to the user's browser. Certain application functions may be encoded in database-resident stored procedures rather than Java application logic.

Application 110 comprises business logic 1406, which implements program functions and provides an interface to data and metadata stored in database 112, and a presentation layer 1404 that organizes output from the business logic for display by a browser or other client. The application server 1402 and associated Web server are communicatively coupled to presentation layer 1404 and business logic 1406. In this arrangement, the Web server, application server, and database server form a 3-tier architecture.

In an embodiment, Financial Management application 110 is an Internet-enabled application based on the Java® language and related platform elements, such as Java 2 Enterprise Edition (J2EE) elements. Thus, presentation layer 1404 and business logic 1406 preferably are implemented using Java.

Database 112 may be based on standard relational databases such as Oracle 8i.

Browser 105 displays HTML pages, such that Financial Management application 110 is not hardware specific. In one embodiment, the elements of Financial Management application 110 shown in FIG. 14 execute in a two-processor X86/Linux or Sun Sparc/Solaris server. An additional two-processor server may execute the reporting server.

Alert messages may be sent using e-mail, as well as using a messaging area within application 110.

(6) Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method providing automatic control of a financial plan that is embodied in a set of logically linked electronic forward-looking financial statements, the method comprising the computer-implemented steps of:

creating and storing a plurality of hierarchies, wherein the plurality of hierarchies include a business unit hierarchy and a functional unit hierarchy;

creating and storing an electronic forward-looking profit and loss statement having a plurality of target spending amounts, an electronic forward-looking balance sheet associated with the forward-looking profit and loss statement, and an electronic forward-looking statement of cash flows associated with the forward-looking profit and loss statement and the forward-looking balance sheet;

creating and storing one or more first logical links to link one or more lines of the forward-looking profit and loss statement to one or more corresponding lines of the forward-looking statement of cash flows;

creating and storing one or more second logical links to link one or more lines of the forward-looking profit and loss statement and one or more lines of the forward-looking balance sheet to one or more corresponding lines of the forward-looking statement of cash flows, wherein lines of the forward-looking profit and loss statement correspond to at least one of an underlying organizational spending plan associated with the functional unit hierarchy;

receiving a user input;

associating the user input with a forward-looking statement selected from the group consisting of the forward-looking profit and loss statement, the forward-looking balance sheet and the forward-looking statement of cash flows, wherein associating includes updating the selected forward-looking statement; and automatically updating the corresponding lines of each of the forward-looking statements associated with the selected forward-looking statement and the plurality of hierarchies;

receiving user input providing one or more updates to the set of financial statements in a private planning environment;

receiving user input requesting to publish the set of financial statements from the private planning environment to a shared planning area; and publishing the set of electronic financial statements to the shared planning area only when one or more amounts in the set of financial statements being published satisfy one or more constraints in a related set of financial statements.

2. A computer-implemented method providing automatic control of a financial plan that is embodied in a set of logically linked electronic forward-looking financial statements, the method comprising:

creating and storing a plurality of hierarchies, wherein the plurality of hierarchies include a business unit hierarchy and a functional unit hierarchy;

creating and storing an electronic forward-looking profit and loss statement having a plurality of target spending amounts, an electronic forward-looking balance sheet associated with the forward-looking profit and loss statement, and an electronic forward-looking statement of cash flows associated with the forward-looking profit and loss statement and the forward-looking balance sheet;

creating and storing one or more first logical links to link one or more lines of the forward-looking profit and loss statement to one or more corresponding lines of the forward-looking statement of cash flows;

creating and storing one or more second logical links to link one or more lines of the forward-looking profit and loss statement and one or more lines of the forward-looking balance sheet to one or more corresponding lines of the forward-looking statement of cash flows, wherein lines of the forward-looking profit and loss statement correspond to at least one of an underlying organizational spending plan associated with the functional unit hierarchy;

receiving a user input;

associating the user input with a forward-looking statement selected from the group consisting of the forward-looking profit and loss statement, the forward-looking balance sheet and the forward-looking statement of cash flows, wherein associating includes updating the selected forward-looking statement;

automatically updating the corresponding lines of each of the forward-looking statements associated with the selected forward-looking statement and the plurality of hierarchies;

creating and storing in a private planning area, one or more forward-looking departmental spending plan statements and one or more third logical links which link one or more lines of the forward-looking profit and loss statement and one or more lines of the forward-looking department spending plan statements;

receiving user input requesting to publish one of the forward-looking department spending plan statements from the private planning area to a shared planning area;

determining whether each entry in the forward-looking department spending plan statements is less than or equal to the corresponding target spending amount in the forward-looking profit and loss statement;

if each entry in the forward-looking department spending plan statements is less than or equal to the corresponding target spending amount in the forward-looking profit and loss statement, publishing the forward-looking department spending plan statements to the shared planning area; and if at least one entry in the forward-looking department spending plan statements is greater than the corresponding target spending amount in the forward-looking profit and loss statement, restricting the forward-looking department spending plan statements to the private planning area.

3. The method of claim 1, further comprising the steps of:

creating and storing a primary organizational hierarchy comprising nodes representing profit centers of an enterprise;

creating and storing the forward-looking profit and loss statement, the related forward-looking balance sheet, and the related forward-looking statement of cash flows associated with each node of the primary organizational hierarchy; and generating a roll-up set of financial statements for a root node of the primary organizational hierarchy based on financial statements that are associated with child nodes of the primary hierarchy.

4. The method of claim 3, further comprising the steps of:

generating sets of financial statements for any intermediate node of the primary organizational hierarchy based only on financial statements of all child nodes of the intermediate node.

5. The method of claim 3, wherein creating and storing the primary organizational hierarchy comprises creating and storing nodes representing business units and departments in an organization based on geographical contribution to revenue.

6. The method of claim 3, wherein creating and storing the primary organizational hierarchy comprises creating and storing nodes representing products that are related in a family of products.

7. The method of claim 3, wherein creating and storing the primary organizational hierarchy comprises creating and storing nodes representing customers and associated distribution channels through which the customers receive products or services.

8. The method of claim 1, wherein the one or more constraints are satisfied only when each spending amount in the forward-looking profit and loss statement is less than a corresponding target spending amount in a related forward-looking profit and loss statement.

9. The method of claim 1, wherein the one or more constraints are satisfied only when all the income amounts in the forward-looking profit and loss statement are greater than related revenue contribution target amounts in a related forward-looking profit and loss statement.

10. The method of claim 1, further comprising the steps of: creating and storing one or more alternative sets of electronic financial planning documents, wherein each alternative set comprises a related profit and loss statement, balance sheet, and statement of cash flows, and wherein each alternative set is associated with a financial planning scenario.

11. The method of claim 10, further comprising the steps of:

generating a view of a profit and loss statement of a first alternative set among the one or more alternative sets;

receiving user input selecting a second of the alternative sets; and automatically generating an updated view of the profit and loss statement based on the selected second alternative set.

12. The method of claim 1, wherein one or more of the first logical links are pre-configured links among related lines prior to receiving the user input.

13. The method of in claim 1, wherein the forward-looking profit and loss statement comprises one or more pre-configured calculated lines and one or more pre-configured standard lines, wherein the one or more pre-configured calculated lines and standard lines are provided prior to receiving the user input, and wherein the step of automatically updating the related lines of a second electronic document comprises the steps of automatically calculating amounts for the related lines based on one or more mathematical relationships associated with the calculated lines and standard lines.

14. A computer-readable medium carrying one or more sequences of instructions for providing automatic control of a financial plan that is embodied in an electronic forward-looking plan profit and loss statement that includes at least one planned amount for a future accounting period, which instructions, when executed by one or more processors, cause the one or more processors to carry out the steps of:
creating and storing a plurality of hierarchies, wherein the hierarchy includes a business unit hierarchy and a functional unit hierarchy;
creating and storing an electronic forward-looking balance sheet that is associated with the forward-looking profit and loss statement;
creating and storing an electronic forward-looking plan statement of cash flows that is associated with the forward-looking profit and loss statement;
creating and storing one or more first logical links among one or more lines of the forward-looking profit and loss statement to one or more related lines of the statement of cash flows;
creating and storing one or more second logical links among one or more lines of the forward-looking balance sheet to one or more related lines of the forward-looking statement of cash flows, wherein lines of the forward-looking profit and loss statement correspond to at least one of an underlying organizational spending plan associated with the functional unit hierarchy;
receiving user input providing one or more updates to a first electronic document selected from among the forward-looking profit and loss statement, forward-looking balance sheet or forward-looking statement of cash flows;
automatically updating the corresponding lines of a second electronic document selected from among the forward-looking profit and loss statement, forward-looking balance sheet or forward-looking statement of cash flows according to the first and second logical links and the plurality of hierarchies;
receiving user input providing one or more updates to the set of financial statements in a private planning environment;
receiving user input requesting to publish the set of financial statements from the private planning environment to a shared planning area; and
publishing the set of electronic financial statements to the shared planning area only when one or more amounts in the set of financial statements being published satisfy one or more constraints in a related set of financial statements.

15. An apparatus for providing automatic control of a financial plan that is embodied in an electronic forward-looking profit and loss statement that includes at least one planned amount for a future accounting period, comprising:
means for creating and storing a plurality of hierarchies, wherein the hierarchy includes a business unit hierarchy and a functional unit hierarchy;
means for creating and storing an electronic forward-looking balance sheet that is associated with the forward-looking profit and loss statement having a plurality of target spending amounts;
means for creating and storing an electronic forward-looking statement of cash flows that is associated with the forward-looking profit and loss statement;
means for creating and storing an electronic forward-looking statement of cash flows that is associated with the forward-looking profit and loss statement and the forward-looking balance sheet;
means for creating and storing one or more first logical links to link one or more lines of the forward-looking profit and loss statement to one or more at least one corresponding lines of the forward-looking statement of cash flows, wherein lines of the forward-looking profit and loss statement corresponds to at least one of an underlying organizational spending plan associated to at least one of the plurality of hierarchies;
means for creating and storing second logical links to link one or more lines of the forward-looking profit and loss statement and at least one line of the forward-looking balance sheet to one or more corresponding lines of the forward-looking statement of cash flows;
means for receiving user input;
means for associating the user input with a forward-looking statement selected from the group consisting of the forward-looking profit and loss statement, the forward-looking balance sheet and the forward-looking statement of cash flows, wherein associating includes updating the selected forward-looking statement;
means for automatically updating the corresponding lines of each of the forward-looking statements associated with the selected forward-looking statement and the plurality of hierarchies;
means for receiving user input providing one or more updates to the set of financial statements in a private planning environment;
means for receiving user input requesting to publish the set of financial statements from the private planning environment to a shared planning area; and
means for publishing the set of electronic financial statements to the shared planning area only when one or more amounts in the set of financial statements being published satisfy one or more constraints in a related set of financial statements.

16. An apparatus for providing automatic control of a financial plan that is embodied in an electronic forward-looking profit and loss statement that includes at least one planned amount for a future accounting period, comprising:
a network interface that is coupled to the data network for receiving one or more packet flows therefrom;
a processor;
one or more stored sequences of instructions which, when executed by the processor, cause the processor to carry out the steps of:
creating and storing a plurality of hierarchies, wherein the hierarchy includes a business unit hierarchy and a functional unit hierarchy;
creating and storing an electronic forward-looking profit and loss statement having a plurality of target spending amounts, an electronic forward-looking balance sheet associated with the forward-looking profit and loss statement, an electronic forward-looking statement of cash flows associated with the forward-looking profit and loss statement and the forward-looking balance sheet;

creating and storing one or more first logical links to link one or more lines of the forward-looking profit and loss statement to one or more corresponding lines of the forward-looking statement of cash flows;

creating and storing one or more second logical links to link one or more lines of the forward-looking profit and loss statement and one or more lines of the forward-looking balance sheet to one or more corresponding lines of the forward-looking statement of cash flows, wherein lines of the forward-looking profit and loss statement correspond to at least one of an underlying organizational spending plan associated with the functional unit hierarchy;

receiving a user input;

associating the user input with a forward-looking plan statement selected from the group consisting of the forward-looking plan profit and loss statement, the forward-looking balance sheet and the forward-looking statement of cash flows, wherein associating includes updating the selected forward-looking plan statement;

automatically updating the corresponding lines of each of the forward-looking plan statements associated with the selected forward-looking plan statement and the plurality of hierarchies;

receiving user input providing one or more updates to the set of financial statements in a private planning environment;

receiving user input requesting to publish the set of financial statements from the private planning environment to a shared planning area; and publishing the set of electronic financial statements to the shared planning area only when one or more amounts in the set of financial statements being published satisfy one or more constraints in a related set of financial statements.

\* \* \* \* \*

UNITED STATES PATENT AND TRADEMARK OFFICE
CERTIFICATE OF CORRECTION

| | | |
|---|---|---|
| PATENT NO. | : 7,657,471 B1 | Page 1 of 1 |
| APPLICATION NO. | : 09/969134 | |
| DATED | : February 2, 2010 | |
| INVENTOR(S) | : Sarat C. Sankaran et al. | |

It is certified that error appears in the above-identified patent and that said Letters Patent is hereby corrected as shown below:

In column 3, lines 9-10, delete "pro-form a" and insert -- pro-forma --, therefor.

In column 5, line 34, delete "Pro-Form a" and insert -- Pro-Forma --, therefor.

In column 10, line 24, delete "pro-form a" and insert -- pro-forma --, therefor.

In column 10, line 29, delete "Hierarchial" and insert -- Hierarchical --, therefor.

In column 29, line 62, delete "pro-form a" and insert -- pro-forma --, therefor.

In column 37, line 7, in Claim 13, after "of" delete "in".

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,657,471 B1  
APPLICATION NO. : 09/969134  
DATED : February 2, 2010  
INVENTOR(S) : Sankaran et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2558 days.

Signed and Sealed this

Twenty-eighth Day of December, 2010

David J. Kappos  
*Director of the United States Patent and Trademark Office*